(12) United States Patent
Leone et al.

(10) Patent No.: US 10,059,325 B2
(45) Date of Patent: Aug. 28, 2018

(54) METHOD AND SYSTEM FOR CONTROLLING WATER INJECTION

(71) Applicant: Ford Global Technologies, LLC, Dearborn, MI (US)

(72) Inventors: Thomas G. Leone, Ypsilanti, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 15/216,525

(22) Filed: Jul. 21, 2016

(65) Prior Publication Data

US 2018/0022339 A1    Jan. 25, 2018

(51) Int. Cl.

| | |
|---|---|
| *B60W 20/11* | (2016.01) |
| *B60W 10/08* | (2006.01) |
| *B60W 10/11* | (2012.01) |
| *F02B 47/02* | (2006.01) |
| *F02M 25/022* | (2006.01) |
| *F02M 25/025* | (2006.01) |
| *F02M 25/03* | (2006.01) |
| *F02D 41/00* | (2006.01) |

(Continued)

(52) U.S. Cl.
CPC .............. *B60W 20/11* (2016.01); *B60K 6/54* (2013.01); *B60W 10/06* (2013.01); *B60W 10/08* (2013.01); *B60W 10/11* (2013.01); *F02B 47/02* (2013.01); *F02D 41/0025* (2013.01); *F02M 25/022* (2013.01); *F02M 25/025* (2013.01); *F02M 25/0227* (2013.01); *F02M 25/0228* (2013.01); *F02M 25/03* (2013.01); *B60W 2510/0638* (2013.01); *B60W 2510/0666* (2013.01); *B60W 2510/244* (2013.01); *B60W 2710/0644* (2013.01); *B60W 2710/083* (2013.01); *B60W 2710/086* (2013.01); *B60W 2710/1005* (2013.01); *B60W 2710/244* (2013.01); *Y02T 10/121* (2013.01); *Y10S 903/903* (2013.01)

(58) Field of Classification Search
None
See application file for complete search history.

(56) References Cited

U.S. PATENT DOCUMENTS

| | | | |
|---|---|---|---|
| 4,351,289 A | * | 9/1982 | Renda ................... F02D 19/12 123/25 A |
| 4,505,169 A | | 3/1985 | Ganoung |

(Continued)

OTHER PUBLICATIONS

Boeriu, Horatiu, "BMW 1 Series with Direct Water Injection—First Drive," http://www.bmwblog.com/201/07/02/bmw-1-series-with-direct-water-injection-first-drive, Update Jul. 2, 2015, 12 pages.

(Continued)

*Primary Examiner* — Kevin P Mahne
(74) *Attorney, Agent, or Firm* — Julia Voutyras; McCoy Russell LLP

(57) ABSTRACT

Methods and systems are provided for synergizing the benefits of engine water injection in a hybrid vehicle system. During engine operation, in response to a change in driver demand, the controller may opt to switch between water injection states while using stored power assist. The selection may be based on the combination of water injection and stored power offset that provides the highest engine efficiency.

19 Claims, 6 Drawing Sheets

(51) Int. Cl.
*B60W 10/06* (2006.01)
*B60K 6/54* (2007.10)

(56) References Cited

U.S. PATENT DOCUMENTS

| | | | | |
|---|---|---|---|---|
| 4,805,571 | A * | 2/1989 | Humphrey | F01L 1/348 123/25 C |
| 5,148,776 | A | 9/1992 | Connor | |
| 6,112,705 | A * | 9/2000 | Nakayama | F02B 47/02 123/25 C |
| 7,581,528 | B2 | 9/2009 | Stein et al. | |
| 7,748,481 | B2 | 7/2010 | Holmes et al. | |
| 7,877,189 | B2 * | 1/2011 | Leone | F02B 47/02 123/1 A |
| 8,050,831 | B2 | 11/2011 | Martin et al. | |
| 8,096,283 | B2 | 1/2012 | Sumilla et al. | |
| 8,434,431 | B2 * | 5/2013 | Fried | F02B 47/02 123/1 A |
| 8,606,474 | B2 | 12/2013 | Guo et al. | |
| 8,738,255 | B2 | 5/2014 | Carter et al. | |
| 8,870,709 | B2 | 10/2014 | Shelton et al. | |
| 9,067,587 | B1 | 6/2015 | Johri et al. | |
| 9,915,230 | B2 * | 3/2018 | Fujimoto | F02M 25/038 |
| 2008/0202454 | A1 | 8/2008 | Pirault | |
| 2008/0288158 | A1 * | 11/2008 | Leone | F02D 35/027 701/103 |
| 2010/0121559 | A1 * | 5/2010 | Bromberg | F02M 25/0228 701/111 |
| 2010/0268438 | A1 * | 10/2010 | Hiranuma | F01N 3/106 701/102 |
| 2011/0029177 | A1 | 2/2011 | Yeung et al. | |
| 2011/0174267 | A1 | 7/2011 | Sumilla et al. | |
| 2012/0029795 | A1 * | 2/2012 | Surnilla | F02D 35/027 701/111 |
| 2013/0218438 | A1 * | 8/2013 | Surnilla | F02D 41/0025 701/102 |
| 2013/0297162 | A1 | 11/2013 | Dai et al. | |
| 2014/0102403 | A1 * | 4/2014 | Yoshihara | F02D 35/027 123/25 A |
| 2014/0311443 | A1 * | 10/2014 | Leone | F01N 3/20 123/25 R |
| 2014/0366508 | A1 | 12/2014 | Ulrey et al. | |
| 2015/0047607 | A1 | 2/2015 | Glugla et al. | |
| 2017/0022924 | A1 * | 1/2017 | Fujimoto | F02D 41/0057 |
| 2017/0138315 | A1 * | 5/2017 | Fujimoto | F02B 47/02 |
| 2018/0066599 | A1 * | 3/2018 | Narahara | F02D 41/0025 |

OTHER PUBLICATIONS

Thewes, Matthias, et al., "Water Injection for Gasoline Combustion Systems," Efficient Engines, ATZ Live, vol. 76, pp. 10-15, 2012, 6 pages.
Bosch, Robert, "Ford GPTF: Water Injection," Gasoline Systems Presentation, Nov. 18, 2015, 15 pages.
Miller, Kenneth James, et al., "Method and System for Engine Control," U.S. Appl. No. 15/146,687, filed May 4, 2016, 54 pages.
Miller, Kenneth James, et al., "Method and System for Engine Control," U.S. Appl. No. 15/146,784, filed May 4, 2016, 47 pages.
Miller, Kenneth James, et al., "Method and System for Engine Control," U.S. Appl. No. 15/146,809, filed May 4, 2016, 52 pages.
Miller, Kenneth James, et al., "Method and System for Engine Control," U.S. Appl. No. 15/146,822, filed May 4, 2016, 47 pages.
Leone, Thomas G., et al., "Method and System for Controlling Water Injection," U.S. Appl. No. 15/216,497, filed Jul. 21, 2016, 47 pages.

* cited by examiner

METHOD AND SYSTEM FOR CONTROLLING WATER INJECTION

FIELD

The present description relates generally to methods and systems for controlling water usage of an engine coupled in a vehicle having a hybrid transaxle and an energy storage system.

BACKGROUND/SUMMARY

Internal combustion engines may include water injection systems that inject water into a plurality of locations, such as into an intake manifold, upstream of engine cylinders, or directly into engine cylinders. Engine water injection provides various benefits such as an increase fuel economy and engine performance, as well as a decrease in engine emissions. In particular, when water is injected into the engine intake or cylinders, heat is transferred from the intake air and/or engine components to evaporate the water, leading to charge cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, improved wide-open throttle performance, and decreased exhaust temperature. As a result, fuel efficiency is increased. Additionally, greater volumetric efficiency may lead to increased torque. Furthermore, lowered combustion temperature with water injection may reduce NOx emissions, while a more efficient fuel mixture (less enrichment) may reduce carbon monoxide and hydrocarbon emissions.

Engine control systems may select when to use water injection based on engine operating conditions, such as engine knock limitations. One example approach is shown by Surnilla et al. in U.S. Pat. No. 8,096,283. Therein, water usage is based on water availability, knock limits, dilution requirements, and spark constraints. Another example approach is shown by Connor in U.S. Pat. No. 5,148,776. Therein water usage is adjusted based on the amount of cooling required to overcome premature ignition of an air-fuel mixture in engine cylinders.

However the inventors herein have recognized potential issues with such approaches. As one example, for water injection into an engine having a step-ratio transmission, the optimal fuel economy gain associated with water usage may not be realized due to the fixed gear ratio of the transmission. In particular, at a given driver demand, based on whether water is being injected or not, there may be an associated fixed engine speed and load range that meets the driver demand. An engine controller may use water injection based on water availability on-board the vehicle. However, when transitioning between operating with or without water injection, there may be engine limitations experienced at the associated engine speed-load that may reduce the fuel economy benefit of the transition. As an example, when water injection is not being used, the engine may become more knock-limited at high loads. Consequently, the optimum engine speed-load for the driver demand may be different from that when water injection is used. Another issue is that frequent changes in operator pedal demand may cause the engine load to move back and forth, leading to frequent switching on and off of water injection. Excessive switches can degrade fuel economy due to losses incurred during transitions, and may degrade the life of the parts. In addition, the frequent switching can result in speed/load and air/fuel ratio disturbances. The issue may be exacerbated in a hybrid vehicle where the engine encounters multiple engine pull-ups and pull-downs (such as during frequent start/stop events) wherein the engine is restarted or shutdown while the vehicle is being propelled.

The inventors herein have recognized that the operating efficiency of a hybrid powertrain may be improved (e.g., maximized) by determining the most efficient water injection state at the driver demanded power, while compensating with battery power, and additionally while smoothing torque transients using motor torque. In particular, battery power can be leveraged to reduce the frequency of water injection state switching while also improving the operating efficiency, without being hindered by associated constraints and trade-offs. In addition, the fuel economy benefits of an engine configured with water injection may be better leveraged through integration with a hybrid transaxle (such as a modular hybrid transmission, or MHT) which may enable the engine speed and load to be adjusted based on water usage (and availability) while maintaining the power output of the engine. In one example, fuel economy may be improved by a method for a hybrid vehicle including an engine configured with water injection and a modular hybrid transaxle (MHT). The method may comprise: for a power level, comparing a first fuel economy without water injection and a first amount of stored power offset from an energy storage system to a second fuel economy with water injection at a first adjusted engine speed-load and a second amount of stored power offset; responsive to the second fuel economy exceeding the first fuel economy, and a higher than threshold water availability, injecting an amount of water into the engine and changing to the first adjusted engine speed-load; and responsive to the first fuel economy exceeding the second fuel economy or a lower than threshold water availability, operating the engine without water injection, and changing the engine speed-load to a second adjusted engine speed-load.

As an example, a hybrid vehicle system may be configured with a battery powered electric motor for propelling vehicle wheels via motor torque, an engine configured with water injection, and a hybrid transaxle (such as an MHT). Water may be injected from a water reservoir into an intake manifold of the engine via one or more of central and port injection, and/or directly into an engine cylinder. At any given driver demand, the controller may be configured to compare the fuel efficiency versus power with and without water injection. The controller may further calculate the efficiency of each water injection state with a range of battery offsets, where the energy efficiency of the electrical system to generate, store, discharge, and propel is combined with the energy efficiency of the engine to determine a total efficiency for each possible battery offset. The battery offsets may be determined based on the state of charge of the system battery and may include a positive offset (wherein battery power via battery discharging is used to boost engine output) as well as a negative offset (wherein battery power via battery charging is used to adjust engine output). The controller may then select whether to continue in the current water injection state (with or without battery offset) or transition to the water injection state (with or without battery offset) by comparing the corresponding fuel efficiencies. Specifically, if a higher than threshold improvement in efficiency is achieved by transitioning to the other water injection state, the transition may be performed, else the current water injection state may be maintained. In addition, the battery offset corresponding to the more efficient state may be applied. Any transients incurred during the transition may be smoothened using motor torque. Also following the selection of the more efficient water injection state, the controller may use motor torque adjustments as well as hybrid transaxle adjustments to operate the engine in a narrow speed-load operating range where efficiency of the selected water injection state is optimized, while maintaining a given power level of the vehicle. For example, to address knock anticipated while operating without water injection, an engine controller may select a gear ratio of the MHT to increase the engine speed while decreasing the engine load so as to maintain the demanded engine power output. Likewise, when operating with water injection active, a gear ratio of the MHT may be selected to lower the engine speed (relative to the previous engine speed when water injection was inactive) while load is increased (as compared to the previous load when water injection was inactive). Because the quantity of water is limited in the reservoir, a vehicle controller may aim to use the water only when a pre-determined improvement in fuel efficiency occurs, so it only injects the water and adjusts the speed-load when the "water" efficiency improvement exceeds a threshold over the non-water speed-load efficiency.

In this way, fuel economy benefits can be improved. The technical effect of integrating water injection technology in a vehicle having an MHT transmission is that for a given driver demanded power, the benefits of the water injection can be better leveraged. In particular, the engine speed and torque for a given driver demanded power can be adjusted to reduce knock limitations at higher loads to increase the maximum load, and reduce friction losses at lower loads, while accounting for changes in knock limits due to water injection properties. One of the technical effects of using battery power to extend operation of the engine with a given water injection state is that losses associated with frequent switching of the water injection state are reduced. In particular, battery power can be used to keep operating the engine on a current water injection state at a more efficient power. While operating the engine with the more efficient water injection state, battery power can be used up to a threshold to make up any difference in output. While operating the engine with the more efficient and cost-effective water injection state, MHT adjustments can be used to extend engine operation with water injection despite changes in driver or wheel torque demand, and for conditions where the benefit of water injection is small, MHT adjustments can be used to extend engine operation without water injection despite changes in driver or wheel torque demand. By optimizing water usage, the benefits of water injection can be extended over a longer portion of a drive cycle, even when water availability is limited. In this way, an engine can be operated with water injection while providing an improved fuel economy for a given driver demand by increasing the maximum load that can be achieved without knocking, or in other words, by increasing the knock limit.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
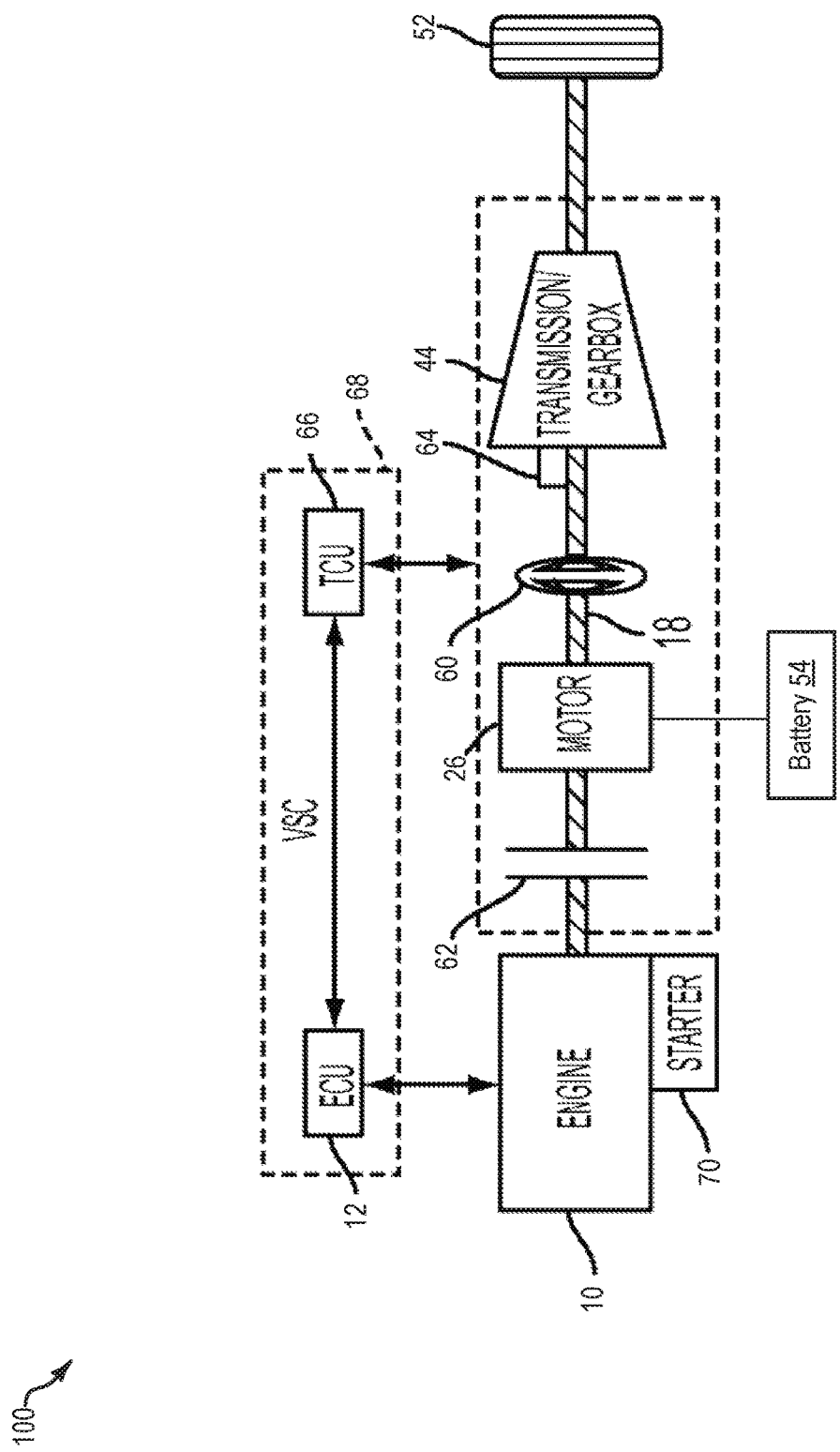
FIG. 1 illustrates an example propulsion system for a hybrid electric vehicle.

The following description relates to systems and methods for improving fuel economy in a hybrid vehicle system having a hybrid transaxle, such as the vehicle system of FIG. 1. The vehicle system may include an engine configured with water injection capabilities, as described with reference to the engine system of FIG. 2. A controller may be configured to perform a control routine, such as the example routine of FIG. 3, to select a water injection state (active or inactive) based on water availability while adjusting an engine speed-load profile via adjustments to a speed ratio of a hybrid transaxle and battery power offset to better leverage the fuel economy benefits of water injection. An example map that may be used by the controller to select whether to maintain or transition between water injection states is shown with reference to FIGS. 5-6. Battery power offset (including positive and negative power offsets) may be applied to overcome issues associated with operating a fixed ratio transmission, as depicted at FIGS. 4A-4B. An example engine operation with water usage, battery power offsets, and hybrid transaxle adjustments is shown at FIG. 7. In this way, water injection technology can be integrated and synergized with hybrid vehicle technology to achieve significant fuel economy improvements.

FIG. 1 depicts a hybrid propulsion system 100 for a vehicle. In the depicted embodiment, the vehicle is a hybrid electric vehicle (HEV), but alternate embodiments could include hybrid vehicles using hydraulic, pneumatic, flywheel, or other energy storage systems and motors. Propulsion system 100 includes an internal combustion engine 10. Fuel may be provided to each cylinder of engine 10 from a fuel system (not shown) including one or more fuel tanks, one or more fuel pumps, and injectors. A detailed embodiment of the engine is provided with reference to FIG. 2.

Hybrid driveline 18 includes a first power source in the form of engine 10 and a second power source in the form of motor 26 which may draw power from battery 54 or an alternate energy storage device. Engine 10 may be operatively connected to a starter 70 that may be used to start the engine 10 when additional torque is needed. An electrical machine, depicted herein as traction motor 26, may be operatively connected to driveline 18 and positioned between the engine 10 and the transmission 44, or gear box. The engine 10 may be selectively coupled to the motor 26 and the transmission 44 by a disconnect clutch 62. Torque transmitted from the engine 10 and motor 26 may be provided through the driveline 18 to the transmission 44, which provides torque to drive the wheels 52.

A torque converter 60 may be provided between the transmission 44 and the engine 10 and/or motor 26 to provide torque through the transmission 44 to the wheels 52. In alternate example, a launch clutch may be provided in place of the torque converter.

The vehicle may include a controller 68, such as a vehicle system controller (VSC), for controlling various vehicle systems and subsystems. The controller 68 may include various types of computer readable storage media to implement volatile and/or persistent memory. Controller 68 is in communication with one or more sensors and actuators (not shown). The one or more sensor(s) may include, for example, a torque sensor 64 positioned to measure an input torque of transmission 44.

In one embodiment, controller 68 is a VSC that includes an engine control unit (ECU) 12 and a transmission control unit (TCU) 66. The ECU 12 is electrically connected to the engine 10 for controlling the operation of the engine. The TCU 66 is electrically connected to and controls the motor 26 and the transmission 44. The ECU 12 is in communication with the TCU 66 and other controllers (not shown) over a vehicle network using a common bus protocol (e.g., CAN), in accordance with one or more embodiments of the present disclosure. Although the illustrated embodiment depicts the VSC 66 functionality for controlling the MHT powertrain as being contained within two controllers (ECU 12 and TCU 66), other embodiments of the hybrid vehicle may include a single VSC controller and/or any other combination of controllers for controlling the MHT powertrain.

The shifting of an automatic transmission is accompanied by applying and/or releasing multiple friction elements (such as plate clutches, band-brakes, etc.) that change speed and torque relationships by altering gear configurations. Friction elements may be actuated hydraulically, mechanically or through other strategies using one or more associated actuators that may be in communication with a microprocessor-based controller implementing a particular control strategy based on signals received from one or more sensors. A realizable combination of gear configurations determines a total number of ratio steps.

During a typical synchronous upshift event from a lower gear configuration to a higher gear configuration, both the gear ratio (defined as automatic transmission input shaft speed/output shaft speed) and the torque ratio (defined as automatic transmission output shaft torque/input shaft torque) become lower. During the upshift event, a friction element (referred to as an off-going clutch (OGC)) associated with the lower gear configuration disengages while a different friction element (referred to as an on-coming clutch (OCC)) associated with a higher gear configuration engages.

In the depicted example, the transmission is a modular hybrid transmission (MHT) 44, herein also referred to as a hybrid transaxle, including mechanical and hydraulic controls for a system of multiple, fixed, stepped ratio gears arranged for multiple forward speeds, reverse speed and a neutral position. The MHT may be an automatic transmission that has fixed speed ratios, similar to other mechanical transmissions that offer a finite number of fixed gear ratios (speed ratios). For example, an engine speed may be lowered while an engine load is correspondingly increased to maintain a power output by adjusting the MHT to a lower speed ratio. As another example, an engine speed may be raised while an engine load is correspondingly decreased to maintain a power output by adjusting the MHT to a higher speed ratio.

However, due to the fixed speed ratios, the range of engine speed adjustments possible is limited. Map 400 of FIG. 4A graphically depicts this issue. Map 400 depicts change in engine speed while operating at a higher gear of the MHT at line 402 and a corresponding change in engine speed while operating at a lower gear of the MHT at line 404. Operating at the higher gear includes operating with a higher speed ratio while operating at the lower gear includes operating with a lower speed ratio. At a given vehicle speed (Vs), depicted here at 405, the engine may be operated at a first operating point 406, at the higher gear with a first, lower engine speed (Spd1), and the engine load correspondingly increased. Alternatively, for the same vehicle speed 405, the engine may be operated at a second operating point 408, at the lower gear with a second, higher engine speed (Spd2), and the engine load correspondingly decreased. However, the engine may not be operable at any speed in between Spd1 and Spd2 due to the fixed gear ratio. As such, for a given driver demand, there is an operating point with a particular engine speed-load combination that provides the highest performance efficiency (that is, delivers the largest amount of power for a given amount of fuel). This operating point may change based on whether water is being injected into the engine or not. However, there may be conditions when neither operating point 406 nor 408 are the most efficient for the given driver demand and the given water injection state.

Map 450 of FIG. 4B graphically depicts this issue. In particular, map 450 compares fuel efficiencies associated with different water injection states for a given driver demanded power output, as well as comparing fuel efficiencies associated with different engine speed-load profiles for a given water injection state. Map 450 depicts a first line of best efficiency versus power with water injection disabled (water_inactive), herein also referred to as a first fuel optimum-efficiency load limit 454 (depicted as a solid line). Map 450 also depicts a second line of best efficiency versus power with water injection enabled (water_active), herein also referred to as a second optimum-efficiency load limit 456 (depicted as a dashed line). The plots are shown with engine speed along the x-axis and engine load or torque along the y-axis. Engine speed-load combinations corresponding to a given driver demand are plotted along power line 458. Power line 458 corresponds to a line of constant power for a first power demand. Engine operating points 462 and 460 on line 458 depict two such combinations whose product provides the same (first) engine power output. Additional such lines corresponding to higher and lower power outputs may be similarly plotted (not shown here). As such, the point of intersection between power line 458 and first fuel optimum-efficiency load limit 454 represents an engine speed-load combination that has the maximum efficiency when operating the engine with water injection disabled. Likewise, the point of intersection between power line 458 and second fuel optimum-efficiency load limit 456 represents an engine speed-load combination that has the maximum efficiency when operating the engine with water injection enabled.

In the depicted example, the driver demanded power 458 may be met by operating a fixed ratio transmission, such as the MHT of FIG. 1, in either a lower gear or a higher gear. When operating at the lower gear, the driver demanded power may be provided by the engine operating with a first, lower speed Spd_1 and a higher engine load at operating point 462. In comparison, when operating at the higher gear, the same driver demanded power may be provided by the engine operating with a second, higher speed Spd_2 and a lower engine load at operating point 460. However, neither of operating point 460 and 462 fall on maximum efficiency lines 456 or 454. In other words, the operating points do not represent the most efficient operating point in either water injection state. Due to the fixed speed ratio of the MHT, an operating point in between 460 and 462 that falls on either maximum efficiency line 456 or 454 is also not possible. This results in engine performance being lower than is possible for a given driver demand.

As elaborated herein with reference to FIGS. 3-6, an engine controller may use one or more such efficiency maps to determine the most efficient operating point where an engine can be operated, with or without water injection, via adjustments to a gear ratio of the MHT. Furthermore, if the engine cannot be operated at the most efficient operating point, with or without water injection, because of the fixed gear ratios, then battery power of the MHT may be used to offset the engine power. This enables fuel economy benefits of operating an engine with water injection to be better leveraged. Example speed ratio and water injection state selections are described with reference to FIGS. 5-6. In some examples, a generator may be drivably connected to electric motor 26 such that each of the electric generator and electric motor 26 may be operated using electric energy from an electrical energy storage device, herein depicted as battery 54. In some embodiments, an energy conversion device, such as an inverter, may be coupled between the battery and the motor to convert the DC output of the battery into an AC output for use by the electric motor. However, in alternate embodiments, the inverter may be configured in the electric motor.

Electric motor 26 may be operated in a regenerative mode, that is, as a generator, to absorb energy from vehicle motion and/or the engine and convert the absorbed kinetic energy to an energy form suitable for storage in battery 54. Furthermore, electric motor 26 may be operated as a motor or generator, as required, to augment or absorb torque provided by the engine, such as during a transition of engine 10 between different combustion modes (e.g., during transitions between a spark ignition mode and a compression ignition mode). For example, during conditions when the engine torque output is higher than the driver demand, the torque difference may be absorbed at the motor and used to charge the battery, thereby smoothing out the torque transient.

Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event. Accordingly, hybrid propulsion system 100 may be operated in various modes of operation.

For example, the vehicle may be driven in a first engine-on mode, herein also referred to as an "engine" mode, wherein engine 10 is operated as the primary source of torque for powering wheels 52. During the "engine" mode, fuel may be supplied to engine 10 from a fuel tank via a fuel injector so that the engine can spin fueled to provide the torque for propelling the vehicle. Specifically, engine power is delivered to the transmission which in turn delivers the power to wheels 52. Optionally, the engine can be operated to output more torque than is needed for propulsion, in which case the additional power is absorbed by the motor (in generating mode) to charge the battery 54 or supply electrical power for other vehicle loads. In this mode, only engine power is used to propel the vehicle wheels.

In another example, the vehicle may be driven in a second engine-on mode, herein also referred to as an "assist" mode. During the assist mode, engine 10 is operated and used as the primary source of torque for powering wheels 52 and the electric motor is used as an additional torque source to act in cooperation with, and supplement the torque provided by, engine 10. During the "assist" mode, as in the engine-only mode, fuel is supplied to engine 10 so as to spin the engine fueled and provide torque to the vehicle wheels. In this mode, each of engine torque and motor torque is used to propel the vehicle wheels.

In still another example, the vehicle may be driven in an engine-off mode, herein also referred to as an electric mode, wherein battery-powered electric motor 26 is operated and used as the only source of torque for driving wheels 52. As such, during the engine-off mode, no fuel may be injected into engine 10 irrespective of whether the engine is spinning or not. The "engine-off" mode may be employed, for example, when cruising at steady vehicle speed, during braking, light acceleration at low speeds, while stopped at traffic lights, etc. Specifically, motor power is delivered to drives wheels 52. In this mode, only motor torque is used to propel the vehicle wheels.

Controllers 12, 66, and 68 may receive input data from the various sensors, process the input data, and trigger the actuators in response to the processed input data based on instruction or code programmed therein corresponding to one or more routines. Example control routines are described herein with regard to FIG. 3.

It will be appreciated that while the examples disclosed herein are discussed with relation to a hybrid electric vehicle having an electrically actuated motor, this is not meant to be limiting, and the same approach may be applied to other hybrid vehicle systems such as those including a flywheel, hydraulic, and/or pneumatic motor. Likewise, any energy storage system may be used for providing motor torque, including but not limited to a system battery.

Figure 2:
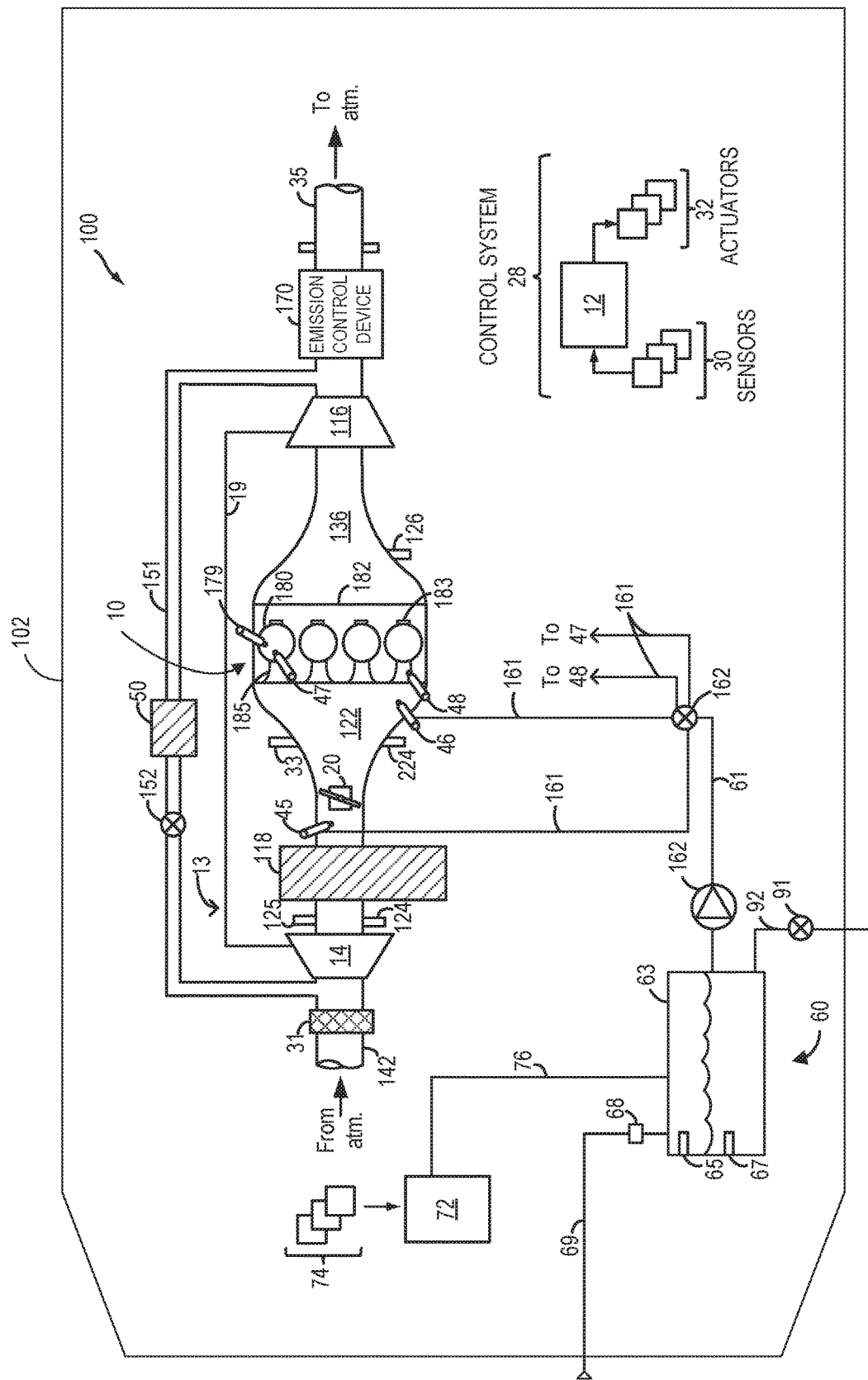
FIG. 2 shows a schematic diagram of an engine system including a water injection system.

FIG. 2 shows an example embodiment of an engine system 100 configured with a water injection system 60. Engine system 100 is coupled in motor vehicle 102, illustrated schematically. Engine system 100 includes an engine 10, which may include engine 10 of FIG. 1. In the depicted embodiment, engine 10 is a boosted engine coupled to a turbocharger 13 including a compressor 14 driven by a turbine 116. Specifically, fresh air is introduced along intake passage 142 into engine 10 via air cleaner 31 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 2, compressor 14 is coupled, through charge air cooler (CAC) 118 to throttle valve (e.g., intake throttle) 20. The CAC may be an air-to-air or air-to-coolant heat exchanger, for example. Throttle valve 20 is coupled to engine intake manifold 122. From the compressor 14, the hot compressed air charge enters the inlet of the CAC 118, cools as it travels through the CAC, and then exits to pass through the throttle valve 20 to the intake manifold 122. In the embodiment shown in FIG. 2, the pressure of the air charge within the intake manifold is sensed by manifold air pressure (MAP) sensor 224 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened responsive to compressor surge.

Intake manifold 122 is coupled to a series of combustion chambers or cylinders 180 through a series of intake valves (not shown) and intake runners (e.g., intake ports) 185. As shown in FIG. 2, the intake manifold 122 is arranged upstream of all combustion chambers 180 of engine 10. Additional sensors, such as manifold charge temperature (MCT) sensor 33 and air charge temperature sensor (ACT) 125 may be included to determine the temperature of intake air at the respective locations in the intake passage. The air temperature may be further used in conjunction with an engine coolant temperature to compute the amount of fuel that is delivered to the engine, for example. Each combustion chamber may further include a knock sensor 183 for identifying and differentiating abnormal combustion events, such as knock and pre-ignition. In alternate embodiments, one or more knock sensors 183 may be coupled to selected locations of the engine block.

The combustion chambers are further coupled to exhaust manifold 136 via a series of exhaust valves (not shown). The combustion chambers 180 are capped by cylinder head 182 and coupled to fuel injectors 179 (while only one fuel injector is shown in FIG. 2, each combustion chamber includes a fuel injector coupled thereto). Fuel may be delivered to fuel injector 179 by a fuel system (not shown) including a fuel tank, a fuel pump, and a fuel rail. Fuel injector 179 may be configured as a direct injector for injecting fuel directly into combustion chamber 180, or as a port injector for injecting fuel into an intake port upstream of an intake valve of the combustion chamber 180.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 116. Alternatively, a two-state exhaust gas oxygen sensor may be substituted for UEGO sensor 126.

As shown in FIG. 2, exhaust from the one or more exhaust manifold sections is directed to turbine 116 to drive the turbine. When reduced turbine torque is desired, some exhaust may be directed instead through a waste gate (not shown), by-passing the turbine. The combined flow from the turbine and the waste gate then flows through emission control device 170. In general, one or more emission control devices 170 may include one or more exhaust after-treatment catalysts configured to catalytically treat the exhaust flow, and thereby reduce an amount of one or more substances in the exhaust flow.

All or part of the treated exhaust from emission control device 170 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped from downstream of turbine 116. The EGR valve 152 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and increased performance. In other embodiments, the EGR system may be a high pressure EGR system with EGR passage 151 connecting from upstream of the turbine 116 to downstream of the compressor 14. In some embodiments, the MCT sensor 23 may be positioned to determine the manifold charge temperature, and may include air and exhaust recirculated through the EGR passage 151.

Combustion chamber 180 also receives water and/or water vapor via water injection system 60. Water from water injection system 60 may be injected into the engine intake or directly into the combustion chambers 180 by one or more of water injectors 45-48. As one example, water may be injected into intake manifold 122, upstream of throttle 20, via water injector 45, herein also referred to as central water injection. As another example, water may be injected into intake manifold 122, downstream of the throttle, via water injector 46. As yet another example, water may be injected into one or more intake runners (e.g., intake ports) 185 via water injector 48 (herein also referred to as port water injection), and/or directly into combustion chamber 180 via water injector 47 (herein also referred to as direct water injection). In one embodiment, injector 48 arranged in the intake runners may be angled toward and facing the intake valve of the cylinder which the intake runner is attached to. As a result, injector 48 may inject water directly onto the intake valve, resulting in faster evaporation of the injected water and a higher dilution benefit from the water vapor. In another embodiment, injector 48 may be angled away from the intake valve and arranged to inject water against the intake air flow direction through the intake runner. As a result, more of the injected water may be entrained into the air stream, thereby increasing the charge cooling benefit of the water injection.

Though only one representative injector 47 and injector 48 are shown in FIG. 1, each combustion chamber 180 and intake runner 185 may include its own injector. In alternate embodiments, water injection system 60 may include water injectors positioned at one or more of these positions. For example, the engine may include only water injector 46, in one embodiment. In another embodiment, the engine may include each of water injector 46, water injectors 48 (one at each intake runner), and water injectors 47 (one at each combustion chamber).

Water injection system 60 includes a water storage tank 63, a water lift pump 162, a collection system 72, and a water filling passage 69. Water stored in water tank 63 is delivered to water injectors 45-48 via water passage 61 and conduits 161. In embodiments that include multiple injectors, water passage 61 may contain a valve 162 (e.g., diverter valve, multi-way valve, proportioning valve, etc.) to direct water to the different water injectors via the corresponding conduits. Alternatively, each conduit 161 may include respective valves within the water injectors 45-48, for adjusting water flow there-through. In addition to water lift pump 162, one or more additional pumps may be provided in conduits 161 for pressurizing the water directed to the injectors, such as in the conduit coupled to direct water injector 47.

Water storage tank 63 may include a water level sensor 65 and a water temperature sensor 67, which may relay information regarding water conditions to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. If the level of water in the water tank 63 is higher than a threshold level, it may be inferred that there is sufficient water available for injection, and accordingly water injection may be enabled by the controller. Else, if the level of water in the water tank 63 is lower than the threshold level, it may be inferred that there is insufficient water available for injection, and therefore water injection may be disabled by the controller.

In the depicted embodiment, water storage tank 63 may be manually refilled via water filling passage 69 and/or refilled automatically by the collection system 72 via water tank filling passage 76. Collection system 72 may be coupled to one or more vehicle components 74 so that the water storage tank can be refilled on-board the vehicle with condensate collected from various engine or vehicle systems. In one example, collection system 72 may be coupled with an EGR system to collect water condensed from exhaust passing through the EGR system. In another example, collection system 72 may be coupled with an air conditioning system (not shown) for collected water condensed from refrigerant passing through a condenser. Manual filling passage 69 may be fluidically coupled to a filter 68, which may remove small impurities contained in the water. A drain 92 including a drain valve 91 may be used to drain water from the water storage tank 63 to a location outside the vehicle (e.g., onto the road), such as when a quality of the water is deemed to be lower than a threshold and not suitable for injection into the engine (e.g., due to low conductivity, high particulate content, etc.).

FIG. 2 further shows a control system 28. Control system 28 may be communicatively coupled to various components of engine system 100 to carry out the control routines and actions described herein. Control system 28 may include an electronic digital controller 12. Controller 12 may be a microcomputer, including a microprocessor unit, input/output ports, an electronic storage medium for executable programs and calibration values, random access memory, keep alive memory, and a data bus. Controller 12 may receive input from a plurality of sensors 30, such as the various sensors of FIGS. 1-2, to receive input including transmission gear position, accelerator pedal position, brake demand, vehicle speed, engine speed, mass airflow through the engine, boost pressure, ambient conditions (temperature, pressure, humidity), etc. Other sensors include CAC 118 sensors, such as CAC inlet air temperature, ACT sensor 125 and pressure sensor 124, CAC outlet air temperature sensor, and MCT sensor 23, knock sensor 183 for determining ignition of end gases and/or water distribution among cylinders, and others. The controller 12 receives signals from the various sensors of FIGS. 1-2 and employs the various actuators of FIGS. 1-2 to adjust engine operation based on the received signals and instructions stored on a memory of the controller. For example, injecting water to the engine may include adjusting a pulse-width of injectors 45-48 to vary an amount of water injected while also adjusting a timing of the water injection and a number of injection pulses. In some examples, the storage medium may be programmed with computer readable data representing instructions executable by the processor for performing the methods described below (e.g., at FIG. 3) as well as other variants that are anticipated but not specifically listed.

In this way, the system of FIGS. 1-2 enables a vehicle system comprising: an engine; a motor powered via an energy storage system; a fuel injector for delivering fuel from a fuel tank to the engine; a water injector for delivering water from a water reservoir to the engine; a modular hybrid transaxle (MHT) coupling the engine and the motor to vehicle wheels, the MHT having a plurality of speed ratios; and a controller with computer readable instructions stored on non-transitory memory for: estimating a first efficiency associated with operating the engine with the water injector deactivated and a first power offset from the energy storage system; estimating a second efficiency associated with operating the engine with the water injector activated and a second, different power offset; if the second efficiency is higher than the first efficiency, and a water level in the water reservoir is higher than a threshold, activating the water injector, adjusting an output of the motor to provide the second power offset, and selecting one of the plurality of speed ratios of the MHT to operate the engine with a first modified engine speed-load profile; and if the second efficiency is lower than the first efficiency, or the water level in the water reservoir is lower than the threshold, deactivating the water injector, adjusting the output of the motor to provide the first power offset, and selecting another one of the plurality of speed ratios of the MHT to provide a second modified engine speed-load profile, different from the first modified engine speed-load profile. In a further example, the first modified engine speed-load profile is based on an engine knock limit and engine friction when operating with water injection, wherein the second modified engine speed-load profile is based on an engine knock limit and engine friction when operating without water injection, wherein the first modified engine speed-load profile has a lower engine speed and a higher engine load than the second modified engine speed-load profile, and wherein an output power of the engine with the water injector activated and the first modified engine speed-load profile is same as the output power of the engine with the water injector deactivated and the second modified engine speed-load profile.

Figure 3:
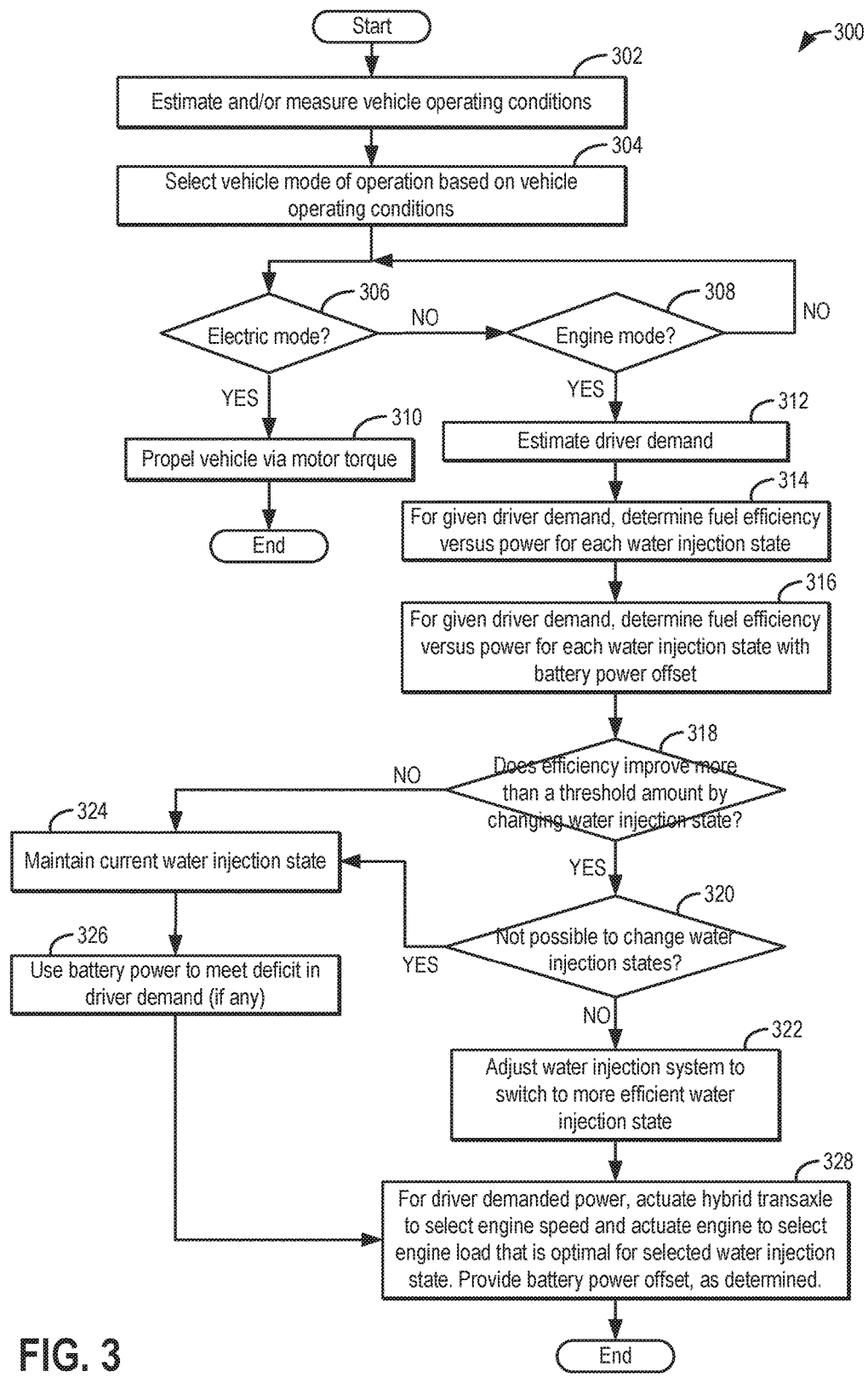
FIG. 3 shows a high level flow chart for selecting a water injection state for use in the engine system of FIG. 1 based on concurrent adjustments to an engine speed-load profile via hybrid transaxle adjustments.
Figure 4A:
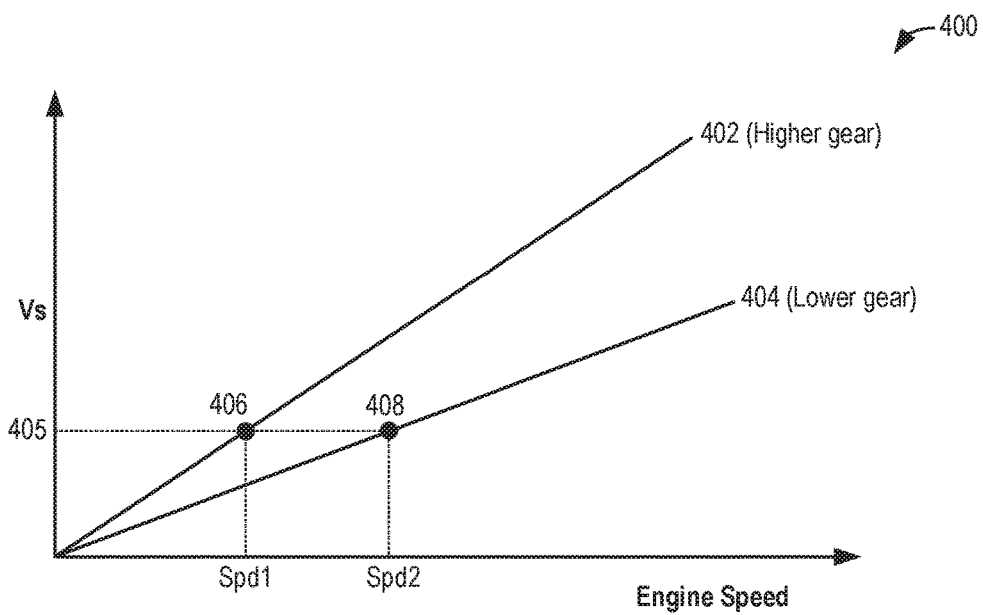
FIGS. 4A-4B show maps depicting issues with vehicle performance during operation with a fixed ratio transmission.
Figure 4B:
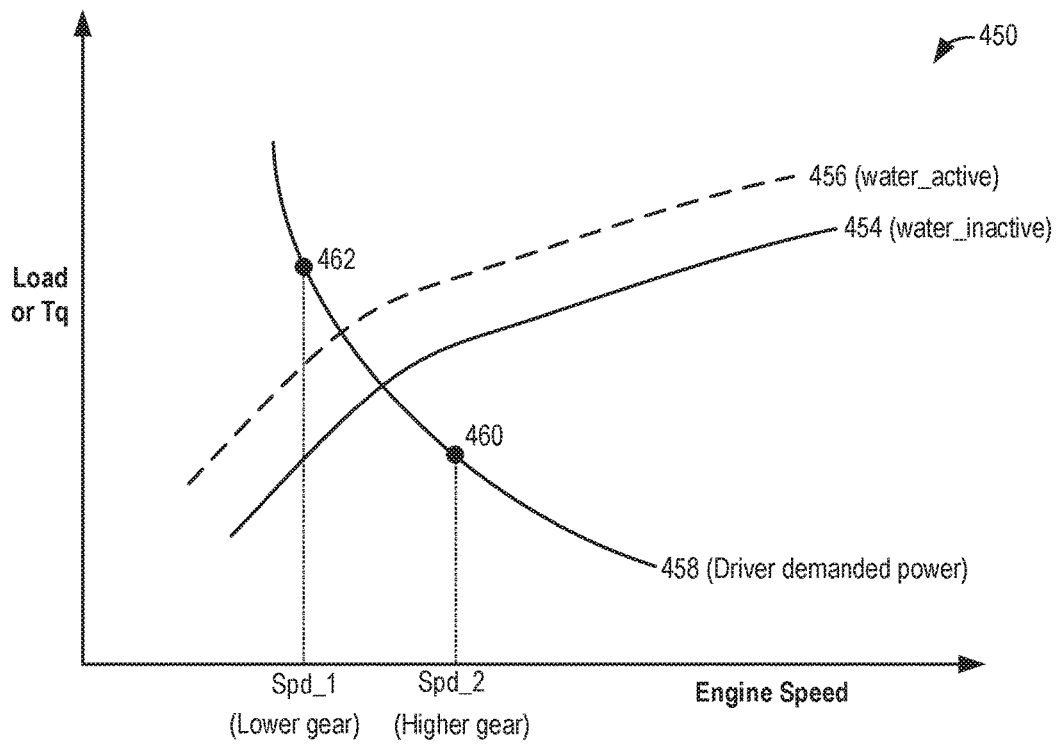

Now turning to FIG. 3, an example routine 300 is described for coordinating adjustments to selection of a water injection state with motor operation and adjustments to a speed ratio of a modular hybrid transmission (MHT) or hybrid transaxle in a hybrid vehicle system. The method enables motor torque adjustments to be leveraged to extend engine operation with a fuel efficient water injection state despite changes in driver torque demand. In addition, a powertrain profile of the engine (including engine speed and load) can be adjusted while maintaining a demanded power output of the engine and while leveraging the charge cooling properties (such as octane rating and knock mitigating ability) and fuel economy benefits of water injection. Instructions for carrying out method 300 as well the other methods included herein may be executed by a controller based on instructions stored on a memory of the controller and in conjunction with signals received from sensors of the engine system, such as the sensors described above with reference to FIGS. 1-2. The controller may employ engine and motor actuators of the hybrid vehicle system to adjust vehicle operation, according to the methods described below. For example, the controller may adjust the activation and pulse-width of a water injector delivering water and select a gear ratio of the MHT to operate the engine at a selected engine speed.

At 302, the routine includes estimating and/or measuring vehicle operating conditions. These may include, for example, driver torque demand (such as based on output of a pedal position sensor coupled to an operator pedal), ambient temperature, pressure and humidity, engine temperature, battery state of charge, fuel level in fuel tank, water level in water reservoir, octane rating of available fuel, etc. In addition, engine operating conditions such as manifold pressure (MAP), manifold air flow (MAF), engine temperature, catalyst temperature, intake temperature, knock limits, etc., may be estimated.

At 304, the method includes selecting a vehicle mode of operation based on the estimated vehicle operating conditions. This includes shifting between propelling the vehicle using motor torque and engine torque responsive to the operating conditions, including the driver demand. For example, an electric mode of operation may be selected when the torqe demand is lower, when the fuel level in the fuel tank is lower, and/or when the battery state of charge is higher. In the electric mode, the vehicle wheels may be propelled only via motor torque from an electric motor that is powered by a system battery. As another example, an engine mode of operation may be selected when the torqe demand is higher, when the fuel level in the fuel tank is higher, and/or when the battery state of charge is lower. In the engine mode, the vehicle wheels may be propelled only via engine torque from an engine. Further still, an assist mode may be selected if the torque is higher than a level that can be provided via only engine torque. Therein, the vehicle wheels may be propelled via each of motor torque and engine torque.

At 306, it may be confirmed if the electric mode was selected. If yes, then at 310, the method includes propelling the vehicle via motor torque. If an electric mode is not confirmed, at 308, it may be confirmed if the engine mode was selected. If yes, then at 312, the method includes estimating the driver demand. In one example, the driver torque demand may be inferred from an operator pedal position, such as an accelerator pedal position. The hybrid vehicle may be propelled via the engine operating in a first water injection state (which may include water injection being active or inactive) based on driver demand, and in response to a change in driver demand, the controller may select between maintaining the current water injection state or transitioning to a second, different water injection state based on each of the change in driver demand and a battery state of charge. The selecting may be further based on fuel economy benefits achieved using a battery power offset.

Specifically, at 314, the method includes, for the given driver demand, comparing the efficiency of the given fuel of the engine in each water injection state. The different water injection states include an active water injection state wherein water injection is enabled and water is injected into the engine (such as into the cylinder, into the intake port, or into the intake manifold), and a deactivated water injection state wherein water injection is disabled. As such, the active water injection state may be enabled only if there is sufficient water in the water tank. As one example, the fuel efficiency of the engine with water injection enabled may be compared to the fuel efficiency of the engine with water injection disabled.

In embodiments where there are multiple water injector options, the fuel efficiency with each of the various water injection options (such as direct injection, port injection, and central injection of water) may be compared. For example, the fuel efficiency of engine operation without water injection may be compared to the efficiency of injecting water directly into an engine cylinder via a direct water injector, and to injecting water into an intake port upstream of an intake valve via a port water injector, and also to injecting water into an intake manifold, upstream or downstream of an intake throttle, via a central water injector.

As used herein, the fuel efficiency of the engine may be defined as the amount of work generated for a given amount of fuel in each water injection state, where a commonly used metric in the art, is BSFC for brake specific fuel consumption. In one example, the controller may compare the fuel efficiency of the two water injection states by comparing the brake specific fuel consumption (BSFC) of the engine for each state. The BSFC of the engine in each water injection state may be stored in tables, maps, and/or equations as a function of operating conditions such as RPM, load, torque, temperature, humidity, fuel octane, etc. In particular, for the driver demand, the controller may determine the BSFC of the engine with water injection disabled and then determine the efficiency as the inverse of the BSFC. Then the controller may determine an amount of water required to be injected, and calculate the fuel efficiency with water injection enabled (including the fuel efficiency with the determined amount of water being provided via direct injection, port injection, and/or central injection), and determine the efficiency as the inverse of the BSFC.

At 316, the method includes, for the given driver demand, determining the fuel efficiency versus power for each water injection state with a battery power offset. As such, various battery power offsets may be assessed, the battery power offset range selected based on a current battery state of charge (indicative of an amount of battery power that can be provided as well as an amount of charge that can be taken up by the battery). The battery power offsets may include one of an increase in the battery state of charge via charging of the battery using engine power, and decrease in the battery state of charging via discharging of the battery to supplement the engine power. For example, the controller may repeat the efficiency calculation (e.g., BSFC calculation) assuming 5, 10, −5, and −10 kW battery offsets to the engine. Herein, 5 and 10 kW (positive) offsets imply battery power being used to boost engine power, with the battery being discharged to operate the engine in a more efficient operating region. In comparison, −5, −10 kW (negative) offsets imply battery power being drawn from engine power, with the battery being charged via the engine power to operate the engine in a more efficient operating region. In one example, the battery power offset applied with the usage of the first water injection state (e.g., water injection active) may be different from the battery power offset applied with usage of the second water injection state (e.g., water injection inactive). In other examples, the offsets may be same. Example maps that may be used to determine the battery power offset are described with reference to FIGS. 5-6.

At 318, the method includes determining if the efficiency of the engine improves by more than a threshold amount by changing the water injection state from the current state the engine is in to the other state, while taking into account the efficiency improvements achieved in each state with the battery power offset.

In one example, the controller may determine an amount of fuel needed to meet the driver demand with and without water injection. In engine speed-load regions where water injection provides a knock mitigating benefit, spark retard usage is reduced which reduces the net amount of fuel required to meet a given driver demand. The controller may retrieve a fuel cost and use the retrieved fuel cost to calculate the cost of operating the engine with the determined amount of fuel needed to meet the driver demand with and without water injection. The controller may divide the efficiency by the fuel cost to get a power per dollar assessment for each water injection state. Then the controller may retrieve an estimated cost for the battery power (associated with the battery offset) assuming an average cycle efficiency for battery power that is generated from the engine. The controller may divide the efficiency of delivering power from the battery by the fuel cost plus the cost of power to charge the battery to get a battery power per dollar assessment. A comparison of these values may be used to determine if the efficiency has improved sufficiently to warrant a transition between water injection states.

As an example, the engine may be currently operating with water injection disabled and in response to a change in the driver demand, it may be determined if the fuel efficiency of the engine improves by more than a threshold amount by transitioning to operating with water injection enabled (in both cases without a battery offset). In another example, the engine may be currently operating with water injection enabled and in response to a change in the driver demand, it may be determined if the fuel efficiency of the engine improves by more than a threshold amount by transitioning to operating with water injection disabled (in both cases without a battery offset). As such, the controller may select the water injection state that provides the lower BFSC as the more efficient state.

In yet another example, the controller may compare the power per dollar values of the current water injection state with different battery power offsets to the other water injection state with the different battery power offsets and select the water injection state-battery power offset combination with the highest power per dollar value. This includes determining if the cost of operating the engine with the current water injection state with (or without) a battery offset is higher than the cost of operating the engine with the other water injection state with (or without) a battery offset. Further, it may be determined if the difference in costs is higher than a threshold amount.

If the efficiency of the engine does not improve by more than the threshold amount, then at 324, the method includes maintaining the current water injection state of the engine. That is, if the net result with the water injection transition and the battery power offset is a fuel loss, then the current water injection state in the engine is maintained. Herein, if water injection was already enabled, the water injector is maintained activated.

At 326, while maintaining usage of the current water injection state, the controller may compensate for a deficit in driver demand (if any) via motor torque from an electric motor coupled to the battery. In addition, at 328, the controller may adjust the MHT to provide the engine speed-load profile that is optimal for the selected water injection state. This may include maintaining a default engine speed-load profile while maintaining the current water injection state. Alternatively, this may include adjusting the engine speed-load profile for the current water injection state via adjustments to the MHT speed ratio while maintaining the current water injection state. In embodiments where the hybrid vehicle system does not include an MHT, motor torque adjustments may be used to hold the engine in a speed-load region that is optimal for the current water injection state.

In this way, MHT and/or motor torque adjustments may be used to adjust the engine speed-load profile while in the current water injection state to achieve additional fuel economy benefits. For example, if the current state includes water injection being enabled, a gear ratio of the MHT may be selected that enables the engine speed to be lowered, while the engine load is raised via adjustments to an engine torque actuator to reduce friction losses at low loads while in the current water injection state and while maintaining a demanded power level of the engine. Alternatively, when the current state is water injection disabled, the threshold could be negative, so that the water turns off when the fuel benefit of water still exists but is very small. This would save the water for future higher fuel efficiency benefit events.

If the efficiency of the engine does improve by more than the threshold amount, that is, the net result with the water state transition and/or the battery power offset is a net benefit, then the method moves to 320 to determine if there are any reasons why it may not be possible to switch to the alternate water injection state. In one example, the current water injection state includes water injection being inactive, the alternate water injection state includes the water injection being active, wherein it may not be possible to switch to the alternate water injection state due to a water level in a water reservoir of the water injection system being lower than a threshold level or due to the amount of water available being less than the water desired to be injected. As another example, it may not be possible to transition to the alternate water injection state due to a water injection system component being degraded (e.g., degraded water injector, degraded water pump, etc.). Further still, it may not be possible to transition to the alternate water injection state due to an estimated quality of the water available for injection being poor (such as due to low conductivity of the water).

If it is possible to switch to the alternate state, such as when water availability is limited, then at 322, the method proceeds to transition the engine to the water injection state with the higher efficiency via adjustments to the corresponding water injectors. For example, if the alternate state includes water injection being disabled, the controller may send a signal to deactivate the water injector(s). As another example, if the alternate state includes water injection being enabled, the controller may send a pulse-width signal to the water injector(s) to enable the determined amount of water to be delivered via the injector into the determined location(s) (e.g., central, port, or direct injection locations). Further, the determined amount of battery offset is applied. This includes using motor torque adjustments to select a battery power setting that provides the determined positive or negative offset.

At 328, the controller may adjust the MHT and engine to provide the engine speed-load profile that is optimal for the selected water injection state (such as an engine speed-load profile that addressing any knock limitations). For example, the engine may be transitioned to the water injection activated state while the MHT is adjusted to a speed ratio that lowers the engine speed. Simultaneously, one or more engine actuators may be adjusted to raise the engine load while maintaining the same powertrain output power. The one or more engine actuators may include, for example, an engine intake throttle, intake and/or exhaust cams, and spark timing. For example, the controller may adjust a degree of opening of the intake throttle, select a timing or profile of the intake and/or exhaust cams, and vary an amount of spark timing retard applied to raise the engine load, the engine load raised by an amount based on the lowering of the engine speed to maintain the same powertrain output power.

Also at 324, while transitioning from the current water injection state to the other water injection state, torque transients may be smoothed using motor torque. In this way, battery power is used to smooth out torque transients by filling in torque holes that are caused by changing water injection states. This leads to additional fuel economy improvements by reducing the need for spark retard which would otherwise have been required to smooth the torque transients. The motor torque may be drawn from an energy storage system not limited to a battery. In other example, the motor torque may include one or more of electric, hydraulic, flywheel, and pneumatic motor torque.

Returning to 320, if it is not possible to switch to the alternate state, then at 324, the method proceeds to maintain the current water injection state in the engine. Thus, even though the other water injection state is more fuel efficient for the given driver demand, the controller may maintain the engine in the current water injection state in view of the inability to provide the requested water injection due to water injection system limitations. Alternatively, the controller may maintain the engine in the current water injection state to avoid excessive water consumption when water availability is limited. As discussed earlier, at 324, the controller may then make up any difference/deficit in torque demand using battery power. Battery power may be used up to a battery power threshold, the battery power threshold based on the state of charge of the battery. In addition, at 328, the controller may adjust the MHT to provide the engine speed-load profile that is optimal for the current water injection state. This may include maintaining a default engine speed-load profile while maintaining the current water injection state, or adjusting the engine speed-load profile for the current water injection state via adjustments to the MHT gear ratio.

Figure 5:
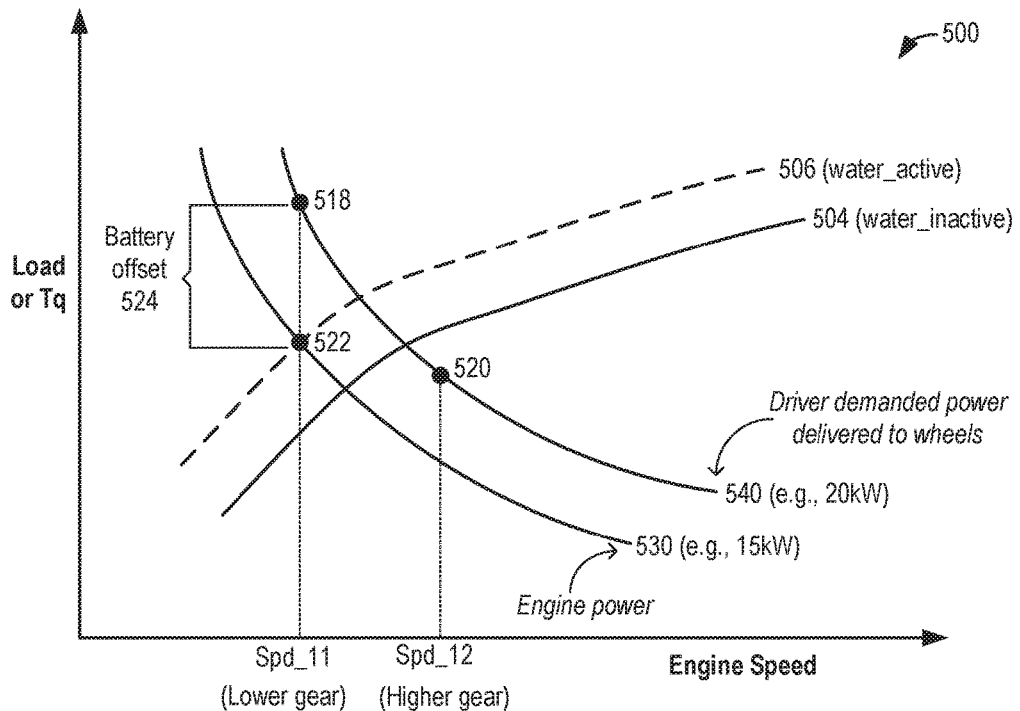
FIGS. 5-6 show example maps for selecting water usage and battery offsets to meet a driver demand.
Figure 6:
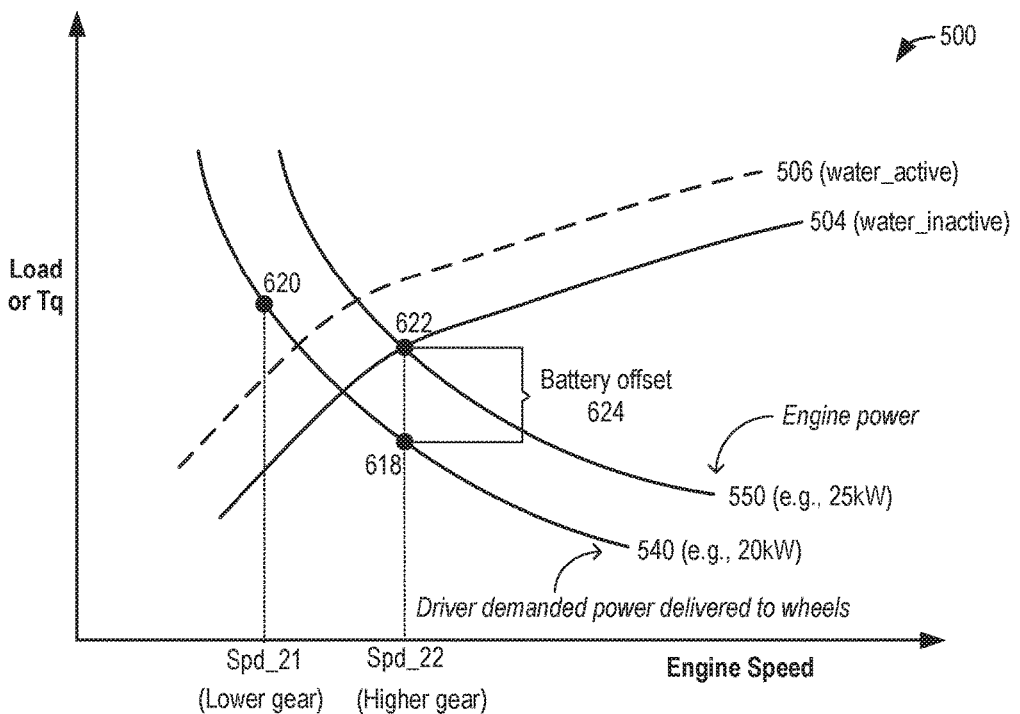
Figure 7:
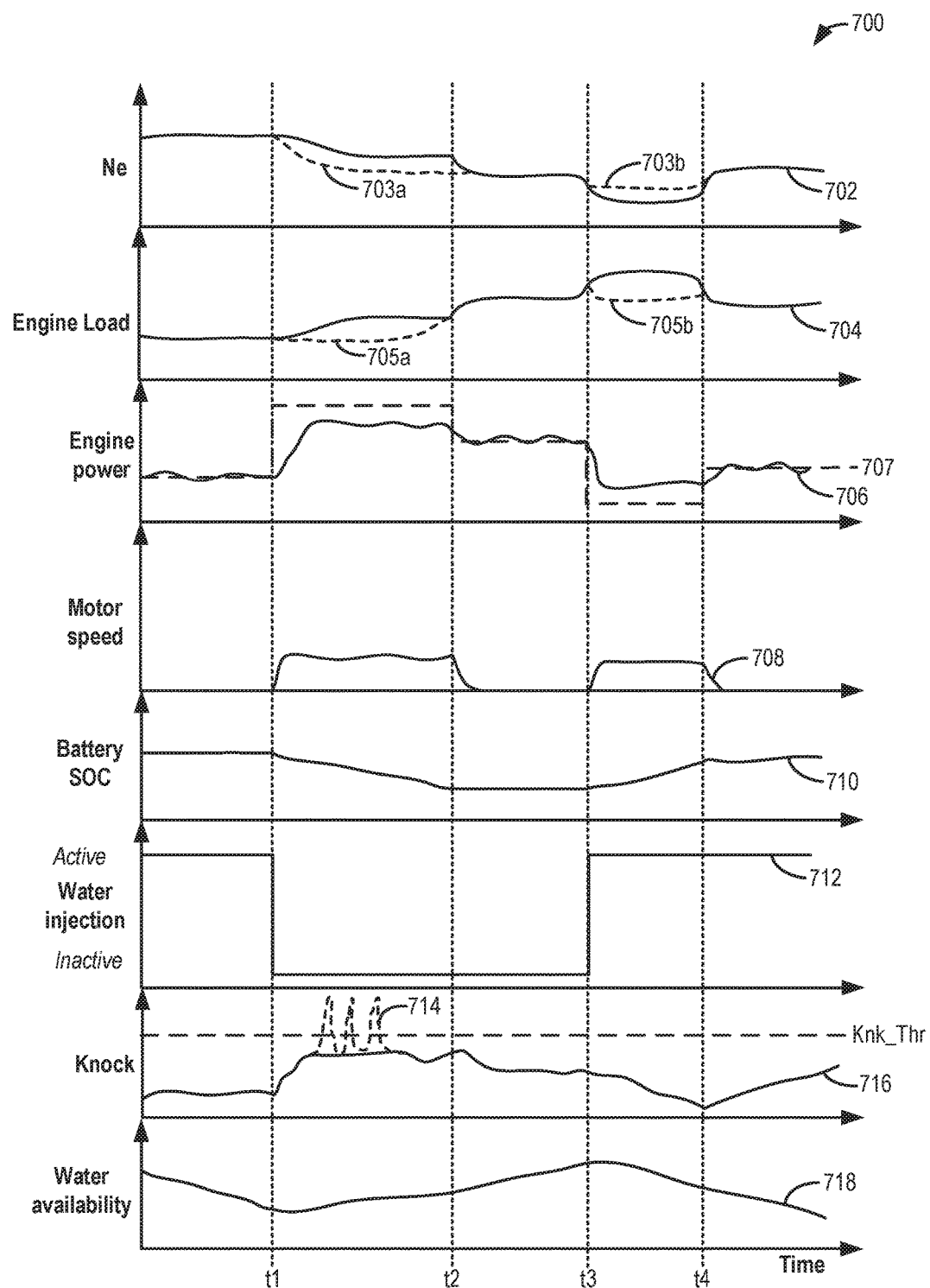
FIG. 7 shows example water usage and hybrid transaxle adjustments during hybrid vehicle operation.

In one example, as elaborated with reference to FIGS. 5-6, the fuel efficiency data gathered from fuel island data maps for each water injection state may be reduced to two best efficiency lines that the controller can more quickly interpolate between in real-time. Otherwise, the controller would have to run an optimization on each map, and then try to further optimize a point in-between the two water injection states. In the present approach, the controller may for use fuel island maps to pre-determine a line of optimal efficiency. Then, for the current power demand, the controller may look up lines of optimal efficiency for a current operating power and evaluate the two curves to determine optimal efficiency. The controller may interpolate linearly between the line of optimal efficiency for a water injection activated state and a water injection deactivated state, as well as for the different speed ratios available at the fixed ratio MHT. Although the line may not be exactly linear, the changes may be small enough that a linear approximation may be a reasonable real-time approximation.

In this way, a hybrid vehicle may be propelled via an engine operating with a water injection state selected based on driver demand and water availability on-board the vehicle; and in response to a change in driver demand, the water injection state may be adjusted based on each of the change in driver demand, a state of charge of an energy storage system, and the water availability. Herein the adjusting may include selecting between maintaining a current water injection state and transitioning to an alternate water injection state based on fuel economy in each of the current and alternate water injection state with a stored power offset based on the state of charge, wherein the current water injection state includes one of a water injection enabled state and a water injection disabled state, and the alternate water injection state includes the other of the water injection enabled state and the water injection disabled state. The stored power offset applied with the first water injection state may be different from the stored power offset applied with the alternate water injection state. Further, the stored power offset may include one of an increase in the state of charge via charging of the energy storage system using engine torque, and decrease in the state of charge via discharging of the stored power to supplement the engine torque. The selecting may include transitioning to the alternate water injection state when the fuel economy associated with the alternate water injection state with the stored power offset is higher than the fuel economy associated with the current water injection state with the stored power offset by more than a threshold amount, and a higher than threshold level of water being available in a water reservoir; and maintaining the current water injection state when the fuel economy associated with the alternate water injection state with the stored power offset is lower than the fuel economy associated with the current water injection state with the stored power offset, or higher by less than the threshold amount, or a lower than threshold level of water being available in the water reservoir. Further, while maintaining the current water injection state, the controller may compensate for a deficit in the driver demand via torque from a motor coupled to the energy storage system. In response to maintaining the current water injection state, the engine may be operated with a first adjusted speed-load profile while maintaining a power level of the vehicle using motor torque, and in response to transitioning to the alternate water injection state, the engine may be operated with a second adjusted speed-load profile while maintaining the power level of the vehicle using motor torque. Therein the first adjusted engine speed-load profile may be based on a knock limit of engine operation with the current water injection state while the second adjusted engine speed-load profile may be based on a knock limit of engine operation with the alternate water injection state. As an example, the current water injection state includes the water injection enabled state and the first adjusted engine speed-load includes a lower than default engine speed and a higher than default engine load, and wherein the alternate water injection state includes the water injection disabled state and the second adjusted engine speed-load includes a higher than default engine speed and a lower than default engine load. The hybrid vehicle may include a modular hybrid transaxle (MHT) and operating with the first adjusted speed-load profile may include selecting a first speed ratio of the MHT that matches the first adjusted speed-load profile, while operating with the second adjusted speed-load profile may include selecting a second, different speed ratio of the MHT that matches the second adjusted speed-load profile. As such, a power level of the engine may be maintained at each of engine operation in the current water injection state with the first adjusted speed-load profile and engine operation with the alternate water injection state with the second adjusted engine speed-load, wherein the power level is a powertrain output of the engine determined as a product of engine load and engine speed. As used herein, operating the engine in the water enabled injection state may include injecting an amount of water into the engine via one or more of direct injection into an engine cylinder via a direct water injector, port injection into an intake port upstream of an intake valve via a port water injector, and central injection into an intake manifold, upstream or downstream of an intake throttle, via a central water injector.

Turning now to FIG. 5, an example map 500 is shown for comparing fuel efficiencies associated with different water injection states for a given driver demanded power output, as well as for comparing fuel efficiencies associated with different engine speed-load profiles for different speed ratios of an MHT at a given water injection state. In one example, the map of FIG. 5 may be generated during engine calibration and stored in the engine controller's memory. The controller may then reference the map during engine operation to determine whether to maintain usage of a current water injection state or transition to an alternate water injection state responsive to a change in driver demand. In addition, the controller may reference the map to determine which fixed speed ratio of an MHT to operate the engine in, and to further determine a battery power offset that may be used to operate the engine with the maximum fuel efficiency while providing the demanded power. In this way, engine power and battery power may be combined to provide the demanded power while operating the engine most fuel efficiently.

Map 500 of FIG. 5 depicts a first line of maximum efficiency versus power with water injection disabled (water_inactive) at plot 504 (depicted as a solid line) and a second line of maximum efficiency versus power with water injection enabled (water_active) at plot 506 (depicted as a dashed line). The plots are shown with engine speed along the x-axis and engine load or torque along the y-axis. Lines of constant power output are depicted at power lines 530 and 540. Each line of constant power output represents engine speed-load combinations whose product provides a given power. In the depicted example, power line 530 represents a constant power output of 15 kW while power line 540 represents a constant power output of 20 kW. Additional such lines corresponding to higher and lower power outputs may be similarly plotted (not shown here). As such, the point of intersection between power line 530 and plot 504 represents an engine speed-load combination that provides 15 kW of power at the maximum efficiency when operating the engine with water injection disabled. Likewise, the point of intersection between power line 530 and plot 506 represents an engine speed-load combination that provides 15 kW of power at the maximum efficiency when operating the engine with water injection enabled. Similarly, the point of intersection between power line 540 and plot 504 represents an engine speed-load combination that provides 20 kW of power at the maximum efficiency when operating the engine with water injection disabled. Likewise, the point of intersection between power line 540 and plot 506 represents an engine speed-load combination that provides 20 kW of power at the maximum efficiency when operating the engine with water injection enabled.

In the depicted example, the driver demanded power is 20 kW. This may be met by operating the engine at operating point 518 wherein the fixed ratio transmission, such as the MHT of FIG. 1, is in a lower gear. As a result of the lower gear ratio selection, at operating point 518, the engine operates at a first, lower speed Spd_11 and a higher engine load. However, operating point 518 falls outside each of plots 506 and 504, and therefore does not represent the most efficient operating point.

As an alternate example, the driver demanded power of 20 kW may be met by operating the engine at operating point 520 wherein the fixed ratio transmission is in a higher gear. As a result of the higher gear ratio selection, at operating point 520, the engine operates at a second, higher speed Spd_12 and a lower engine load. However, operating point 520 also falls outside each of plots 506 and 504, and therefore does not represent the most efficient operating point.

To improve the fuel efficiency under the constraints of the limited speed-load combinations possible with the fixed speed ratio transmission, the controller may instead operate the engine with battery power offset while selecting a speed ratio that optimizes a particular water injection state (which may be the current water injection state or the alternate state). In the depicted example, the fuel efficiency is increased by shifting the engine operating point from 518 to 522. Operating point represents an engine state where the maximum efficiency is provided by operating the transmission in the lower gear, with the engine speed at Spd_11 and with water injection enabled (since it falls on plot 506). Thus the engine is operated more efficiently at operating point 522 by enabling water injection (if water injection was previously disabled) or maintaining water injection enabled (if it was already enabled), and further by shifting to the lower speed ratio of the MHT (if it was in an alternate speed ratio) or maintaining the lower speed ratio of the MHT (if it was already in the lower speed ratio). However, operating point 522 is along power line 530 and represents a lower engine power output than driver demanded power. Therefore, the difference in power between operating points 522 and 518, herein a negative difference (that is, a deficit), is provided using a positive battery power offset 524. That is, battery power corresponding to the difference between operating points 518 and 522 is sent via a motor to the vehicle wheels to meet the driver demanded power, with a resulting discharging of the battery state of charge. Thus in this case, the engine power output is 15 kW, the battery offset is +5 kW, and the combination results in the driver demanded power of 20 kW being delivered to the vehicle wheels. In this way, a driver demand may be met by operating the engine in a water injection state that is most fuel efficient, and selecting a fixed speed ratio that is optimized for the given water injection state. Then, based on the engine power at that operating point being lower than the driver demand, a battery offset that meets the deficit in driver demand is provided.

Turning now to FIG. 6, map 600 depicts another example map for comparing fuel efficiencies associated with different water injection states for a given driver demanded power output, as well as for comparing fuel efficiencies associated with different engine speed-load profiles for different speed ratios of an MHT at a given water injection state. In one example, the map of FIG. 6 may be generated during engine calibration and stored in the engine controller's memory. The controller may then reference the map during engine operation to determine whether to maintain usage of a current water injection state or transition to an alternate water injection state responsive to a change in driver demand. In addition, the controller may reference the map to determine which fixed speed ratio of an MHT to operate the engine in, and to further determine a battery power offset that may be used to operate the engine with the maximum fuel efficiency.

Map 600 of FIG. 6 depicts a first line of maximum efficiency versus power with water injection disabled (water_inactive) at plot 504 (depicted as a solid line) and a second line of maximum efficiency versus power with water injection enabled (water_active) at plot 506 (depicted as a dashed line). The plots are shown with engine speed along the x-axis and engine load or torque along the y-axis. Lines of constant power output are depicted at power lines 540 and 550. Each line of constant power output represents engine speed-load combinations whose product provides a given power. In the depicted example, power line 540 represents a constant power output of 20 kW while power line 550 represents a constant power output of 25 kW. Additional such lines corresponding to higher and lower power outputs may be similarly plotted (not shown here). As such, the point of intersection between power line 540 and plot 504 represents an engine speed-load combination that provides 20 kW of power at the maximum efficiency when operating the engine with water injection disabled. Likewise, the point of intersection between power line 540 and plot 506 represents an engine speed-load combination that provides 20 kW of power at the maximum efficiency when operating the engine with water injection enabled. Similarly, the point of intersection between power line 550 and plot 504 represents an engine speed-load combination that provides 25 kW of power at the maximum efficiency when operating the engine with water injection disabled. Likewise, the point of intersection between power line 550 and plot 506 represents an engine speed-load combination that provides 25 kW of power at the maximum efficiency when operating the engine with water injection enabled.

In the depicted example, the driver demanded power is 20 kW. This may be met by operating the engine at operating point 618 wherein the fixed ratio transmission, such as the MHT of FIG. 1, is in a lower gear. As a result of the lower gear ratio selection, at operating point 618, the engine operates at a first, lower speed Spd_21 and a higher engine load. However, operating point 618 falls outside each of plots 506 and 504, and therefore does not represent the most efficient operating point.

As an alternate example, the driver demanded power of 20 kW may be met by operating the engine at operating point 620 wherein the fixed ratio transmission is in a higher gear. As a result of the higher gear ratio selection, at operating point 620, the engine operates at a second, higher speed Spd_22 and a lower engine load. However, operating point 620 also falls outside each of plots 506 and 504, and therefore does not represent the most efficient operating point.

To improve the fuel efficiency under the constraints of the limited speed-load combinations possible with the fixed speed ratio transmission, the controller may instead operate the engine with battery power offset while selecting a speed ratio that optimizes a particular water injection state (which may be the current water injection state or the alternate state). In the depicted example, the fuel efficiency is increased by shifting the engine operating point from 618 to 622. Operating point represents an engine state where the maximum efficiency is provided by operating the transmission in the higher gear, with the engine speed at Spd_22 and with water injection disabled (since it falls on plot 504). Thus the engine is operated more efficiently at operating point 622 by disabling water injection (if water injection was previously enabled) or maintaining water injection disabled (if it was already disabled), and further by shifting to the higher speed ratio of the MHT (if it was in an alternate speed ratio) or maintaining the higher speed ratio of the MHT (if it was already in the higher speed ratio). However, operating point 622 is along power line 550 and represents a higher engine power output than driver demanded power. Therefore, the difference in power between operating points 622 and 618, herein a positive difference (that is, an excess), is addressed using a negative battery power offset 624. That is, a power corresponding to the difference between operating points 618 and 622 is drawn into the motor from the vehicle wheels to meet the driver demanded power, with a resulting charging of the battery state of charge. Thus in this case, the engine power output is 25 kW, the battery offset is −5 kW, and the combination results in the driver demanded power of 20 kW being delivered to the vehicle wheels. In this way, a driver demand may be met by operating the engine in a water injection state that is most fuel efficient, and selecting a fixed speed ratio that is optimized for the given water injection state. Then, based on the engine power at that operating point being higher than the driver demand, a battery offset that corresponds to the excess in driver demand is provided.

In this way, for a given driver demand, an engine controller may estimate a first fuel economy associated with maintaining a first water injection state where water injection is disabled to a second fuel economy associated with transitioning to a second water injection state where water injection is enabled while operating with a knock-adjusted engine speed-load profile. If the second fuel economy is higher than the first fuel economy, the controller may determine that is more fuel efficient to transition, and the controller may transition the engine to the second water injection state. In addition, the controller may transition the engine to the knock-adjusted engine speed-load profile via adjustments to a speed ratio of the MHT. Further, the controller may transition the engine and meet any difference between the engine power and the demanded power via battery power offsets.

Turning now to FIG. 7, example fuel usage adjustments coordinated with hybrid transaxke and motor torque adjustments in a hybrid vehicle system are shown at map 700. Map 700 depicts changes to an engine speed at plot 702, engine load at plot 704, and engine power at plot 706 relative to a driver demand 707. Map 700 further depicts motor speed for an electric motor of the hybrid vehicle at plot 708, changes to a state of charge of a battery coupled to the electric motor at plot 710, water injection state selection (between a first state with water injection disabled and a second state with water injection enabled) at plot 712, an indication of knock at plot 716, and water availability for water injection (such as based on the output of a level sensor coupled to the water reservoir) at plot 718. All plots are shown over time (along the x-axis). Significant timepoints during vehicle operation are shown at t1-t4. It will be appreciated that as used herein, the engine power is determined as a product of engine speed and engine load (or torque). In addition, the engine speed-load adjustments are achieved via adjustments to a speed ratio of an MHT coupled between the engine and an output shaft. In the present example, the water injection state is switchable between an active and an inactive state, although in alternate examples, multiple active states may be present, each representing a different mode/location of water injection (e.g., direct or port or central water injection).

Prior to t1, the hybrid vehicle is operating in an engine mode with vehicle wheels being propelled using engine torque only (plot 706). In one example, vehicle operation in the engine mode is in response to a higher driver demand (plot 707, dashed line). Due to the vehicle being propelled using engine torque, an electric motor is disabled (plot 708) and the battery SOC may remain constant (plot 710). In particular, prior to t1, an engine power output matching the driver demand is delivered via the engine operating with the depicted engine speed-load profile and with water injection enabled due to higher water availability (such as due to water levels in a water tank being higher than a threshold level). As a result of operating with water injection active, a water level in the water reservoir may be steadily decreasing prior to t1, such that at t2, the water availability is lower.

At t1, in response to an increase in driver demand (such as due to a tip-in), the power output of the engine may be increased to propel the vehicle and meet the driver demand.

Based on driver demand, knock propensity, and battery state of charge (SOC), at t1, it may be more effective to operate the engine with water injection maintained activated. However, due to the lower water availability at t1, the water injection is disabled to limit water consumption.

Also at t1, the engine speed-load profile while operating in the water injection inactive state is adjusted via MHT adjustments so that the power output of the engine can be optimized. In particular, a given engine power is provided using a higher than default engine speed and a lower than default engine load. The default engine speed and load (for the given water injection state) are depicted here as dashed lines 703*a* and 705*a*. The MHT adjustments may include the selection of a gear corresponding to a speed ratio that operates the engine at the target engine speed (for the water injection inactive state) and corresponding adjustments to one or more engine actuators (such as a throttle opening or a cam timing) that operates the engine at a target engine load based on the target engine speed while providing the given engine power output. In particular, if the engine were operated with water injection deactivated and with the default engine speed-load, the engine would have been knock limited, as indicated by predicted knock sensor output 714 (dashed segment) exceeding the knock threshold (Knk_Thr). Herein, by transitioning to the water injection deactivated state and higher engine speed via MHT adjustments, knock at higher loads is addressed while improving the overall engine fuel economy, and without compromising engine power output.

Herein the efficient operation of the engine with the selected speed-load profile and with water injection deactivated results in engine power (plot 706) falling short of the driver demand 707. Accordingly, the deficit in demand in compensated for using motor torque. In particular, the electric motor is spun (plot 708) using energy drawn from the system battery to provide sufficient motor torque to meet the driver demand, with a corresponding drop in the battery SOC (plot 710).

The engine may operate with the higher than default engine speed and lower than default engine load with water injection in active for a duration until t2. At t2, in response to a drop in driver demand, the engine may be operated with water injection inactive state maintained while resuming the default engine speed and default engine load due to the engine not being knock limited any more. This operation may be maintained until t3.

At t3, in response to a decrease in driver demand, the power output of the engine may be decreased. Herein, the power output is decreased while transitioning to operating the engine with water injection enabled due to the water injection active state being more fuel efficient. In addition, further fuel economy benefits are achieved by adjusting the engine speed-load profile via MHT adjustments so that the same engine power is provided using a lower than default engine speed and a higher than default engine load. The default engine speed and load (for the given fuel) are depicted here as dashed lines 703*b* and 705*b*. In particular, if the engine were transitioned to the water injection active state and operated with the default engine speed-load, the engine could have been friction limited. Herein, by transitioning to the lower engine speed and higher engine load via MHT adjustments while transitioning to using water injection, friction losses at lower loads are reduced, while improving the overall engine fuel economy, and without compromising engine power output. In addition, knock is averted.

Herein the efficient operation of the engine with the selected speed-load profile and with water injection reactivated results in engine power (plot 706) exceeding the driver demand 707. Accordingly, the difference in demand in compensated for using motor torque and/or a battery power offset. In particular, the electric motor is spun (plot 708) as a generator, storing the excess energy in the system battery, with a corresponding rise in the battery SOC (plot 710). Engine operation with water injection activated and a speed-load regime optimized for the given water injection state is then continued until t4.

At t4, in response to an increase in driver demand, the power output of the engine is increased while maintaining the engine operating with water injection enabled due to the water injection active state being more fuel efficient. In addition, the engine speed-load profile is returned to the default speed-load profile via MHT adjustments. Herein, by transitioning to the lower engine speed and higher engine load via MHT adjustments while transitioning to using water injection, friction losses at lower loads are reduced, while improving the overall engine fuel economy, and without compromising engine power output. At this time, the engine power output is able to meet the driver demand and no further battery offset is required.

In this way, fuel economy losses in a hybrid vehicle system due to frequent engine pull-ups and pull-downs (such as on a city cycle) can be reduced by integrating water injection technology with hybrid transaxle technology. By using motor torque and battery power to provide a driver demand while maintaining the engine in a more efficient water injection state and in a more efficient operating region for the selected water injection state, frequent switching between water injection states is reduced, even as an operator pedal position changes frequently or oscillates or overshoots. Consequently, even if engine load moves back and forth excessively between the optimum region of different water injection states, fuel economy can be improved by staying in a more efficient setting while applying a small amount of battery power offset to meet the driver demand. As a result, synergistic fuel economy benefits are achieved by leveraging the electric components of a hybrid vehicle system during water usage selection. By leveraging the different engine speed-load combinations achievable for a given engine power output via MHT adjustments, a hybrid vehicle controller can more accurately address engine limitations, such as knock limitations, associated with a water injection state transition. As such, this allows the costs associated with a transition to be more accurately determined, reducing the frequency of inefficient switches responsive to frequent changes in operator or wheel torque demand, or due to changes in water availability. Overall, fuel economy of a hybrid vehicle can be enhanced.

One example method for a hybrid vehicle including an engine configured with water injection and a hybrid transaxle (MHT) comprises: for a power level, comparing a first fuel economy without water injection and a first amount of stored power offset from an energy storage system to a second fuel economy with water injection at a first adjusted engine speed-load and a second amount of stored power offset; responsive to the second fuel economy exceeding the first fuel economy, and a higher than threshold water availability, injecting an amount of water into the engine and changing to the first adjusted engine speed-load; and responsive to the first fuel economy exceeding the second fuel economy or a lower than threshold water availability, operating the engine without water injection, and changing the engine speed-load to a second adjusted engine speed-load.

In the preceding example, additionally or optionally, the method further comprises: responsive to the second fuel economy exceeding the first fuel economy, and the lower than threshold water availability, maintaining engine operation without water injection, changing the engine speed-load to the second adjusted engine speed-load, and using stored power from the energy storage system to meet a deficit between engine output and the power level. In any of the preceding examples, additionally or optionally, the first and second amount of stored power offset is based on a state of charge of the energy storage system and the power level. In any of the preceding examples, additionally or optionally, the first adjusted engine speed-load is based on knock limit and friction limit of engine operation with water injection, and the second adjusted engine speed-load is based on knock limit and friction limit of engine operation without water injection. In any of the preceding examples, additionally or optionally, changing to the first or the second adjusted engine speed-load includes transitioning from a default engine speed-load via adjustments to a speed ratio of the MHT, wherein the first adjusted engine speed-load includes a lower engine speed and a higher engine load as compared to the default engine speed-load, and the second adjusted engine speed-load includes a higher engine speed and a lower engine load as compared to the default engine speed-load. In any of the preceding examples, additionally or optionally, an engine power output with water injection enabled and the first adjusted engine speed-load is same as the engine power output with water injection disabled and the second adjusted engine speed-load. In any of the preceding examples, additionally or optionally, the lower than threshold water availability is due to one of a lower than threshold level of water in a water reservoir of a water injection system coupled to the engine, a lower than threshold quality of water in the water reservoir, and degradation of a component of the water injection system, the component including a water injector and a water pump.

Another example method for a hybrid vehicle comprises: propelling the vehicle via an engine operating with a water injection state selected based on driver demand and water availability on-board the vehicle; and in response to a change in driver demand, adjusting the water injection state based on each of the change in driver demand, a state of charge of an energy storage system, and the water availability. In the preceding example, additionally or optionally, the adjusting includes selecting between maintaining a current water injection state and transitioning to an alternate water injection state based on fuel economy in each of the current and alternate water injection state with a stored power offset based on the state of charge, wherein the current water injection state includes one of a water injection enabled state and a water injection disabled state, and wherein the alternate water injection state includes the other of the water injection enabled state and the water injection disabled state. In any of the preceding examples, additionally or optionally, the stored power offset applied with the first water injection state is different from the stored power offset applied with the alternate water injection state, and wherein the stored power offset includes one of an increase in the state of charge via charging of the energy storage system using engine torque, and decrease in the state of charge via discharging of the stored power to supplement the engine torque. In any of the preceding examples, additionally or optionally, the selecting includes: transitioning to the alternate water injection state when the fuel economy associated with the alternate water injection state with the stored power offset is higher than the fuel economy associated with the current water injection state with the stored power offset by more than a threshold amount, and a higher than threshold level of water being available in a water reservoir; and maintaining the current water injection state when the fuel economy associated with the alternate water injection state with the stored power offset is lower than the fuel economy associated with the current water injection state with the stored power offset, or higher by less than the threshold amount, or a lower than threshold level of water being available in the water reservoir. In any of the preceding examples, additionally or optionally, the method further comprises: while maintaining the current water injection state, compensating for a deficit in the driver demand via torque from a motor coupled to the energy storage system. In any of the preceding examples, additionally or optionally, the method further comprises: in response to maintaining the current water injection state, operating the engine with a first adjusted speed-load profile while maintaining a power level of the vehicle using motor torque, and in response to transitioning to the alternate water injection state, operating the engine with a second adjusted speed-load profile while maintaining the power level of the vehicle using motor torque. In any of the preceding examples, additionally or optionally, the first adjusted engine speed-load profile is based on a knock limit of engine operation with the current water injection state and the second adjusted engine speed-load profile is based on a knock limit of engine operation with the alternate water injection state. In any of the preceding examples, additionally or optionally, the current water injection state includes the water injection enabled state and the first adjusted engine speed-load includes a lower than default engine speed and a higher than default engine load, and wherein the alternate water injection state includes the water injection disabled state and the second adjusted engine speed-load includes a higher than default engine speed and a lower than default engine load. In any of the preceding examples, additionally or optionally, the hybrid vehicle includes a modular hybrid transaxle (MHT) and wherein operating with the first adjusted speed-load profile includes selecting a first speed ratio of the MHT that matches the first adjusted speed-load profile, and wherein operating with the second adjusted speed-load profile includes selecting a second, different speed ratio of the MHT that matches the second adjusted speed-load profile. In any of the preceding examples, additionally or optionally, a power level of the engine is maintained at each of engine operation in the current water injection state with the first adjusted speed-load profile and engine operation with the alternate water injection state with the second adjusted engine speed-load, and wherein the power level is a powertrain output of the engine determined as a product of engine load and engine speed. In any of the preceding examples, additionally or optionally, operating the engine in the water enabled injection state includes injecting an amount of water into the engine via one or more of direct injection into an engine cylinder via a direct water injector, port injection into an intake port upstream of an intake valve via a port water injector, and central injection into an intake manifold, upstream or downstream of an intake throttle, via a central water injector.

Another example vehicle system comprises: an engine; a motor powered via an energy storage system; a fuel injector for delivering fuel from a fuel tank to the engine; a water injector for delivering water from a water reservoir to the engine; a modular hybrid transaxle (MHT) coupling the engine and the motor to vehicle wheels, the MHT having a plurality of speed ratios; and a controller. The controller may be configured with computer readable instructions stored on non-transitory memory for: estimating a first efficiency associated with operating the engine with the water injector deactivated and a first power offset from the energy storage system; estimating a second efficiency associated with operating the engine with the water injector activated and a second, different power offset; if the second efficiency is higher than the first efficiency, and a water level in the water reservoir is higher than a threshold, activating the water injector, adjusting an output of the motor to provide the second power offset, and selecting one of the plurality of speed ratios of the MHT to operate the engine with a first modified engine speed-load profile; and if the second efficiency is lower than the first efficiency, or the water level in the water reservoir is lower than the threshold, deactivating the water injector, adjusting the output of the motor to provide the first power offset, and selecting another one of the plurality of speed ratios of the MHT to provide a second modified engine speed-load profile, different from the first modified engine speed-load profile. In the preceding example, additionally or optionally, the first modified engine speed-load profile is based on an engine knock limit and engine friction when operating with water injection, wherein the second modified engine speed-load profile is based on an engine knock limit and engine friction when operating without water injection, wherein the first modified engine speed-load profile has a lower engine speed and a higher engine load than the second modified engine speed-load profile, and wherein an output power of the engine with the water injector activated and the first modified engine speed-load profile is same as the output power of the engine with the water injector deactivated and the second modified engine speed-load profile.

In a further representation, a method for a hybrid vehicle including an engine configured with water injection and a modular hybrid transaxle (MHT), comprises: for a desired power level, comparing a fuel economy of operating an engine in each water injection state at a first unadjusted engine speed-load and a second adjusted speed-load, selecting a combination of a water injection state and one of the first and second speed-load that has a higher fuel economy, and operating the engine with the selected water injection state and speed-load. The method further includes providing a battery power offset based on a difference between engine power at the selected water injection state and speed-load relative to the desired power level. The method further includes a positive battery power offset with a drop in battery state of charge when the engine power at the selected water injection state and speed-load is lower than the desired power level. Alternatively, the method further includes a negative battery power offset with a rise in battery state of charge when the engine power at the selected water injection state and speed-load is higher than the desired power level. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle including an engine configured with water injection and a modular hybrid transaxle (MHT), comprising:
    for a desired power level, comparing a first fuel economy without water injection and a first amount of stored power offset from an energy storage system to a second fuel economy with water injection at a first adjusted engine speed-load and a second amount of stored power offset;
    responsive to the second fuel economy exceeding the first fuel economy, and a higher than threshold water availability, injecting an amount of water into the engine and changing to the first adjusted engine speed-load; and
    responsive to the first fuel economy exceeding the second fuel economy or a lower than threshold water availability, operating the engine without water injection, and changing an engine speed-load to a second adjusted engine speed-load.

2. The method of claim 1, further comprising, responsive to the second fuel economy exceeding the first fuel economy, and lower than threshold water availability, maintaining engine operation without water injection, changing the engine speed-load to the second adjusted engine speed-load, and using stored power from the energy storage system to meet a deficit between engine output and the desired power level.

3. The method of claim 1, wherein the first and second amounts of stored power offset are based on a state of charge of the energy storage system and the desired power level.

4. The method of claim 1, wherein the first adjusted engine speed-load is based on knock limit and friction limit of engine operation with water injection, and the second adjusted engine speed-load is based on knock limit and friction limit of engine operation without water injection.

5. The method of claim 1, wherein changing to the first or the second adjusted engine speed-load includes transitioning from a default engine speed-load via adjustments to a speed ratio of the MHT, wherein the first adjusted engine speed-load includes a lower engine speed and a higher engine load as compared to the default engine speed-load, and the second adjusted engine speed-load includes a higher engine speed and a lower engine load as compared to the default engine speed-load.

6. The method of claim 1, wherein an engine power output with water injection enabled and the first adjusted engine speed-load is the same as an engine power output with water injection disabled and the second adjusted engine speed-load.

7. The method of claim 1, wherein the lower than threshold water availability is due to one of a lower than threshold level of water in a water reservoir of a water injection system coupled to the engine, a lower than threshold quality of water in the water reservoir, and degradation of a component of the water injection system, the component including a water injector and a water pump.

8. A method for a hybrid vehicle, comprising:
propelling the vehicle via an engine operating with a water injection state selected based on driver demand and water availability on-board the vehicle; and
in response to a change in driver demand, adjusting the water injection state based on each of the change in driver demand, a state of charge of an energy storage system, and the water availability, wherein the adjusting includes selecting between maintaining a current water injection state and transitioning to an alternate water injection state based on fuel economy in each of the current and alternate water injection states with a stored power offset based on the state of charge, wherein the current water injection state includes one of a water injection enabled state and a water injection disabled state, and wherein the alternate water injection state includes the other of the water injection enabled state and the water injection disabled state.

9. The method of claim 8, wherein the stored power offset applied with the current water injection state is different from the stored power offset applied with the alternate water injection state, and wherein the stored power offset includes one of an increase in the state of charge via charging of the energy storage system using engine torque, and a decrease in the state of charge via discharging of stored power to supplement the engine torque.

10. The method of claim 8, wherein the selecting includes:
transitioning to the alternate water injection state when the fuel economy associated with the alternate water injection state with the stored power offset is higher than the fuel economy associated with the current water injection state with the stored power offset by more than a threshold amount, and a higher than threshold level of water being available in a water reservoir; and
maintaining the current water injection state when the fuel economy associated with the alternate water injection state with the stored power offset is lower than the fuel economy associated with the current water injection state with the stored power offset, or higher by less than the threshold amount, or a lower than threshold level of water being available in the water reservoir.

11. The method of claim 8, further comprising, while maintaining the current water injection state, compensating for a deficit in the driver demand via torque from a motor coupled to the energy storage system.

12. The method of claim 8, further comprising, in response to maintaining the current water injection state, operating the engine with a first adjusted speed-load profile while maintaining a power level of the vehicle using motor torque, and in response to transitioning to the alternate water injection state, operating the engine with a second adjusted speed-load profile while maintaining the power level of the vehicle using motor torque.

13. The method of claim 12, wherein the first adjusted engine speed-load profile is based on a knock limit of engine operation with the current water injection state and the second adjusted engine speed-load profile is based on a knock limit of engine operation with the alternate water injection state.

14. The method of claim 12, wherein the current water injection state includes the water injection enabled state and the first adjusted engine speed-load includes a lower than default engine speed and a higher than default engine load, and wherein the alternate water injection state includes the water injection disabled state and the second adjusted engine speed-load includes a higher than default engine speed and a lower than default engine load.

15. The method of claim 12, wherein the vehicle includes a modular hybrid transaxle (MHT) and wherein operating with the first adjusted speed-load profile includes selecting a first speed ratio of the MHT that matches the first adjusted speed-load profile, and wherein operating with the second adjusted speed-load profile includes selecting a second, different speed ratio of the MHT that matches the second adjusted speed-load profile.

16. The method of claim 12, wherein a power level of the engine is maintained at each of engine operation in the current water injection state with the first adjusted speed-load profile and engine operation with the alternate water injection state with the second adjusted engine speed-load, and wherein the power level is a powertrain output of the engine determined as a product of engine load and engine speed.

17. The method of claim 8, wherein operating the engine in the water injection enabled state includes injecting an amount of water into the engine via one or more of direct injection into an engine cylinder via a direct water injector, port injection into an intake port upstream of an intake valve via a port water injector, and central injection into an intake manifold, upstream or downstream of an intake throttle, via a central water injector.

18. A vehicle system, comprising:
an engine;
a motor powered via an energy storage system;
a fuel injector for delivering fuel from a fuel tank to the engine;
a water injector for delivering water from a water reservoir to the engine;
a modular hybrid transaxle (MHT) coupling the engine and the motor to vehicle wheels, the MHT having a plurality of speed ratios; and
a controller with computer readable instructions stored on non-transitory memory for:
estimating a first efficiency associated with operating the engine with the water injector deactivated and a first power offset from the energy storage system;

estimating a second efficiency associated with operating the engine with the water injector activated and a second, different power offset;

if the second efficiency is higher than the first efficiency, and a water level in the water reservoir is higher than a threshold, activating the water injector, adjusting an output of the motor to provide the second power offset, and selecting one of the plurality of speed ratios of the MHT to operate the engine with a first modified engine speed-load profile; and if the second efficiency is lower than the first efficiency, or the water level in the water reservoir is lower than the threshold, deactivating the water injector, adjusting the output of the motor to provide the first power offset, and selecting another one of the plurality of speed ratios of the MHT to provide a second modified engine speed-load profile, different from the first modified engine speed-load profile.

19. The system of claim 18, wherein the first modified engine speed-load profile is based on an engine knock limit and engine friction when operating with water injection, wherein the second modified engine speed-load profile is based on an engine knock limit and engine friction when operating without water injection, wherein the first modified engine speed-load profile has a lower engine speed and a higher engine load than the second modified engine speed-load profile, and wherein an output power of the engine with the water injector activated and the first modified engine speed-load profile is the same as an output power of the engine with the water injector deactivated and the second modified engine speed-load profile.

* * * * *